United States Patent
Ryoo et al.

(10) Patent No.: US 11,228,952 B2
(45) Date of Patent: Jan. 18, 2022

(54) METHOD AND APPARATUS FOR LOW-POWER OPERATIONS OF TERMINAL AND BASE STATION IN MOBILE COMMUNICATION SYSTEM

(71) Applicant: Samsung Electronics Co., Ltd., Suwon-si (KR)

(72) Inventors: Sunheui Ryoo, Yongin-si (KR); Jungsoo Jung, Seongnam-si (KR); Sungjin Lee, Bucheon-si (KR); Rayeon Ahn, Seoul (KR); Jiwon Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 355 days.

(21) Appl. No.: 16/303,954

(22) PCT Filed: May 24, 2017

(86) PCT No.: PCT/KR2017/005364
§ 371 (c)(1),
(2) Date: Nov. 21, 2018

(87) PCT Pub. No.: WO2017/204539
PCT Pub. Date: Nov. 30, 2017

(65) Prior Publication Data
US 2020/0322854 A1    Oct. 8, 2020

Related U.S. Application Data

(60) Provisional application No. 62/340,757, filed on May 24, 2016.

(51) Int. Cl.
*H04W 36/00* (2009.01)
*H04W 76/30* (2018.01)
(Continued)

(52) U.S. Cl.
CPC ... *H04W 36/0058* (2018.08); *H04W 36/0069* (2018.08); *H04W 36/0085* (2018.08);
(Continued)

(58) Field of Classification Search
None
See application file for complete search history.

(56) References Cited

U.S. PATENT DOCUMENTS 9,179,499 B1    11/2015  Fang et al.
2012/0250562 A1*  10/2012  Li ..................... H04W 24/10
                                             370/252

(Continued)

FOREIGN PATENT DOCUMENTS

KR    10-2014-0005149 A    1/2014
WO    2014/182772 A2      11/2014
(Continued)

OTHER PUBLICATIONS

European Search Report dated Apr. 12, 2019, issued in European Patent Application No. 17803058.1.
(Continued)

*Primary Examiner* — Otis L Thompson, Jr.
(74) *Attorney, Agent, or Firm* — Jefferson IP Law, LLP

(57) ABSTRACT

The present disclosure relates to a communication technique for converging IoT technology with a 5G communication system for supporting a higher data transfer rate beyond a 4G system, and a system therefor. The present disclosure can be applied to intelligent services (e.g., smart homes, smart buildings, smart cities, smart or connected cars, health care, digital education, retail business, and services associated with security and safety) on the basis of 5G communication technology and IoT-related technology.

16 Claims, 19 Drawing Sheets

(51) Int. Cl.
*H04W 76/27* (2018.01)
*H04W 84/18* (2009.01)

(52) U.S. Cl.
CPC ............ *H04W 76/27* (2018.02); *H04W 76/30* (2018.02); *H04W 84/18* (2013.01)

(56) References Cited

U.S. PATENT DOCUMENTS

| | | |
|---|---|---|
| 2013/0083713 A1 | 4/2013 | Johansson et al. |
| 2013/0095818 A1 | 4/2013 | Levy et al. |
| 2013/0100838 A1* | 4/2013 | Iwamura ............ H04W 36/0058 370/252 |
| 2013/0148535 A1 | 6/2013 | Baghel et al. |
| 2014/0064160 A1 | 3/2014 | Verger et al. |
| 2014/0155076 A1* | 6/2014 | Wang .................... H04W 24/10 455/450 |
| 2014/0211673 A1 | 7/2014 | Lu et al. |
| 2014/0242960 A1 | 8/2014 | Cai et al. |
| 2014/0295871 A1* | 10/2014 | Ahn ..................... H04W 24/10 455/452.1 |
| 2014/0335863 A1 | 11/2014 | Wu et al. |
| 2015/0201375 A1 | 7/2015 | Vannithamby et al. |
| 2016/0014734 A1 | 1/2016 | Jang et al. |
| 2016/0100345 A1 | 4/2016 | Thangarasa et al. |
| 2016/0198439 A1 | 7/2016 | Dalsgaard et al. |
| 2016/0278129 A1* | 9/2016 | Lopez-Perez ..... H04W 74/0833 |
| 2017/0070985 A1* | 3/2017 | Uchino ............ H04W 72/0406 |
| 2018/0014232 A1* | 1/2018 | Hoehne .................. H04W 4/06 |
| 2018/0270682 A1* | 9/2018 | Zacharias ......... H04W 74/0833 |
| 2018/0316472 A1* | 11/2018 | John Wilson .......... H04W 76/15 |
| 2018/0332659 A1* | 11/2018 | Hwang ................. H04W 48/16 |
| 2019/0053136 A1* | 2/2019 | Lee ........................ H04W 88/06 |
| 2019/0268833 A1* | 8/2019 | Kwok ................... H04W 16/14 |
| 2020/0187209 A1* | 6/2020 | Tamura ................. H04W 76/15 |
| 2020/0275315 A1* | 8/2020 | Futaki ............... H04W 28/0815 |
| 2020/0359288 A1* | 11/2020 | Tang ................. H04W 36/0061 |
| 2020/0396676 A1* | 12/2020 | Ahluwalia ............ H04W 28/18 |

FOREIGN PATENT DOCUMENTS

| | | |
|---|---|---|
| WO | 2015/026316 A1 | 2/2015 |
| WO | 2016/049431 A1 | 3/2016 |
| WO | 2016/056968 A1 | 4/2016 |

OTHER PUBLICATIONS

Indian Office Action dated Sep. 6, 2021, issued in Indian Office Action 201837043829.

* cited by examiner

FIG. 6

| No. | UE MODEM OPERATION | | OPERATION SCENARIO | |
|---|---|---|---|---|
| | 4G LTE | 5G cell | Traffic | Coverage |
| 1 | ON (CONTINUOUS RECEPTION/ C-DRX) | OFF | | OUT of 5G Coverage |
| 2 | ON (CONTINUOUS RECEPTION / C-DRX) | ON (5G Discovery) | BUFFER THRESHOLD OR LESS | IN 5G Coverage |
| 3 | ON (CONTINUOUS RECEPTION / C-DRX) | ON (CONTINUOUS RECEPTION) | BUFFER THRESHOLD OR MORE | IN 5G Coverage |
| 4 | ON (C-DRX) | ON (C-DRX) | NO traffic [AFTER DRX TIMER] | IN 5G Coverage |
| 5 | ON (C-DRX) | ON (5G Discovery) | NO traffic [AFTER 5G SHORT CP TAIL] | IN 5G Coverage |
| 6 | Idle (Disconnected) | | NO traffic [AFTER 4G CP TAIL] | |

FIG. 11

| No. | UE MODEM OPERATION | | | OPERATION SCENARIO | | |
|---|---|---|---|---|---|---|
| | 4G LTE | 5G cell | High Qual. Traffic | Coverage | QOS CONDITION | |
| 1 | ON (CONTINUOUS RECEPTION) | Idle (Idle DRX) | NOT SUPPORTED | 4G (+5G) | Buffer Low | |
| 2 | ON | ON | SUPPORTED | 4G +5G | Buffer High | |
| 3 | Idle (Idle DRX) | ON (CONTINUOUS RECEPTION) | SUPPORTED | 5G Cell Center | Buffer High | |

METHOD AND APPARATUS FOR LOW-POWER OPERATIONS OF TERMINAL AND BASE STATION IN MOBILE COMMUNICATION SYSTEM

TECHNICAL FIELD

The present disclosure relates to a communication system and, more particularly, to a method and apparatus for reducing a control burden on a network, power consumption and consumption power of a user equipment.

BACKGROUND ART

In order to satisfy a wireless data traffic demand that tends to increases after the 4G communication system commercialization, efforts to develop an improved 5G communication system or pre-5G communication system is being made. For this reason, the 5G communication system or pre-5G communication system is called a beyond 4G network communication system or a post LTE system.

In order to achieve a high data transfer rate, the 5G communication system is considered to be implemented in an mmWave band (e.g., 60 GHz band). In order to reduce a loss of electric waves and increase the transfer distance of electric waves in the mmWave band, beamforming, massive MIMO, full dimensional MIMO (FD-MIMO), array antenna, analog beam-forming and large scale antenna technologies are being discussed in the 5G communication system.

Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP) and reception interference cancellation, are being developed in the 5G communication system.

In addition, hybrid FSK and QAM modulation (FQAM) and sliding window superposition coding (SWSC) that are advanced coding modulation (ACM) schemes, improved filter bank multi-carrier (FBMC), non-orthogonal multiple access (NOMA) and sparse code multiple access (SCMA) are being developed in the 5G system.

Meanwhile, the Internet evolves from a human-centered connection network over which human generates and consumes information to Internet of Things (IoT) in which information is exchanged and process between distributed elements, such as things. An Internet of Everything (IoE) technology in which a big data processing technology through a connection with a cloud server is combined with the IoT technology is emerging. In order to implement the IoT, technical elements, such as the sensing technology, wired/wireless communication and network infrastructure, service interface technology and security technology, are required. Accordingly, technologies, such as a sensor network, machine to machine (M2M) and machine type communication (MTC) for a connection between things, are recently researched. In the IoT environment, an intelligent Internet technology (IT) service in which a new value is created for human life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and composition between the existing information technology (IT) and various industries.

Accordingly, various attempts to apply the 5G communication system to the IoT are being made. For example, 5G communication technologies, such as a sensor network, machine to machine (M2M) and machine type communication (MTC), are implemented by schemes, such as beamforming, MIMO, and an array antenna. The application of a cloud wireless access network (cloud RAN) as the aforementioned big data processing technology may be said to be an example of convergence between the 5G technology and the IoT technology.

Meanwhile, a radio resource control (RRC) state in which a wireless communication terminal transmits and receives data has been conservatively designed based on a previous generation communication system based on a voice call. For example, a terminal has severe power consumption because it maintains the standby time (e.g., Connected DRX) in the RRC connected state although there is no traffic arrival for a given time after traffic reception. Furthermore, in the case of a smartphone user, data, such as a keep alive message not related to user quality of service (QoS), frequently occurs. If an RRC connection therefor is maintained as at the present, terminal power consumption may become further deteriorated.

DISCLOSURE OF INVENTION

Technical Problem

In the same/similar frequency band environment in a band of 6 GHz or less, if dual connectivity in which a macrocell and a small cell operate is applied to 5G without any change, an inefficiency problem becomes further great in the power consumption aspect. A terminal performs communication with a macrocell and a small cell by consecutively performing measurement on the macrocell and the small cell and activating a plurality of modems in the RRC connected state through the dual connectivity technology. This may result in a problem in that power consumption of a terminal is deepened when taking into consideration power consumption in the mmWave beamforming environment of a high frequency band.

Accordingly, in order to solve the aforementioned problems, in the present disclosure, an RRC Idle interval is extended and user equipment power efficiency is improved by minimizing the RRC connected state for a 5G cell through CP tail minimization control of a base station.

Furthermore, in the present disclosure, a 5G cell link activation state (RRC Connected state and measurement execution) of a user equipment is minimized, and QoS (specifically, latency criterion) of a user is also satisfied. Moreover, in the present disclosure, network (N/W) signaling overhead and power consumption of a user equipment, additionally occurring due to frequent transition from the RRC Idle state to the RRC connected state although a user equipment enters the RRC Idle state in the early stage due to a CP tail reduction, are minimized.

Solution to Problem

In order to solve the above problem, a method of a user equipment supporting a first radio access technology (RAT) and a second RAT in a mobile communication system includes detecting whether a condition for activating a second connection based the second RAT is satisfied through a first connection based the first RAT and releasing the second connection when the transmission and reception of traffic through the second connection is completed and a timer configured with respect to the second connection expires. The timer for the second connection and a timer for the first connection are differently configured.

In accordance with an embodiment of the present disclosure, the condition for activating the second connection may be determined based on the capacity of a buffer for data to be transmitted and received by the user equipment, and the timer for the second connection may be configured to be shorter than the timer for the first connection.

In accordance with an embodiment of the present disclosure, the method further includes performing measurement on the second connection prior to the detecting. The measurement may be performed based on at least one of whether the user equipment is present in coverage of the second connection, information about a service to be provided through the second connection, and information about traffic to be transmitted and received through the second connection.

In accordance with an embodiment of the present disclosure, the method further includes identifying that the user equipment enters coverage of the second connection using an indicator received through the first connection prior to the detecting.

In order to solve the above problem, a user equipment supporting a first radio access technology (RAT) and a second RAT in a mobile communication system includes a transceiver unit configured to transmit and receive signals and a controller configured to detect whether a condition for activating a second connection based the second RAT is satisfied through a first connection based the first RAT and to release the second connection when the transmission and reception of traffic through the second connection is completed and a timer configured with respect to the second connection expires. The timer for the second connection and a timer for the first connection are differently configured.

In accordance with an embodiment of the present disclosure, the condition for activating the second connection may be determined based on the capacity of a buffer for data to be transmitted and received by the user equipment, and the timer for the second connection may be configured to be shorter than the timer for the first connection.

In accordance with an embodiment of the present disclosure, the controller may be configured to perform measurement on the second connection prior to the detecting. The measurement may be performed based on at least one of whether the user equipment is present in coverage of the second connection, information about a service to be provided through the second connection, and information about traffic to be transmitted and received through the second connection.

In accordance with an embodiment of the present disclosure, the controller may be configured to identify that the user equipment enters coverage of the second connection using an indicator received through the first connection prior to the detecting.

In order to solve the above problem, a method of a base station to communicate with a user equipment supporting a first radio access technology (RAT) and a second RAT in a mobile communication system includes activating a second connection with the user equipment when the user equipment detects that a condition for activating the second connection based the second RAT is satisfied through a first connection based the first RAT and releasing the second connection when the transmission and reception of traffic the second connection is completed and a timer configured with respect to the second connection expires. The timer for the second connection and a timer for the first connection are differently configured.

In accordance with an embodiment of the present disclosure, the condition for activating the second connection may be determined based on the capacity of a buffer for data to be transmitted and received by the user equipment. The timer for the second connection may be configured to be shorter than the timer for the first connection.

In accordance with an embodiment of the present disclosure, the user equipment may perform measurement on the second connection before the user equipment detects that the condition is satisfied. The measurement may be performed based on at least one of whether the user equipment is present in coverage of the second connection, information about a service to be provided through the second connection, and information about traffic to be transmitted and received through the second connection.

In accordance with an embodiment of the present disclosure, before the user equipment detects that the condition is satisfied, the user equipment may identify that the user equipment enters coverage of the second connection using an indicator received through the first connection prior to the detecting.

In order to solve the above problem, a base station to communicate with a user equipment supporting a first radio access technology (RAT) and a second RAT in a mobile communication system includes a transceiver unit configured to transmit and receive signals and a controller configured to activate a second connection with the user equipment when the user equipment detects that a condition for activating the second connection based the second RAT is satisfied through a first connection based the first RAT and to release the second connection when the transmission and reception of traffic the second connection is completed and a timer configured with respect to the second connection expires. The timer for the second connection and a timer for the first connection are differently configured.

In accordance with an embodiment of the present disclosure, the condition for activating the second connection may be determined based on the capacity of a buffer for data to be transmitted and received by the user equipment. The timer for the second connection may be configured to be shorter than the timer for the first connection.

In accordance with an embodiment of the present disclosure, the user equipment may perform measurement on the second connection before the user equipment detects that the condition is satisfied. The measurement may be performed based on at least one of whether the user equipment is present in coverage of the second connection, information about a service to be provided through the second connection, and information about traffic to be transmitted and received through the second connection.

In accordance with an embodiment of the present disclosure, before the user equipment detects that the condition is satisfied, the user equipment may identify that the user equipment enters coverage of the second connection using an indicator received through the first connection prior to the detecting.

Advantageous Effects of Invention

Through the present disclosure, a power consumption reduction effect of a UE is expected because the 5G cell RRC connected state of UEs capable of a 5G multi-RAT is maintained to a minimum through a CP tail minimization control operation of a BS. Furthermore, a cost efficiency effect through a power consumption reduction in a 5G BS (RU/TRxP) is expected because a measurement operation for a 5G cell of a UE is limitedly performed. Furthermore, an increase in radio resource use efficiency is expected through a reduction in 5G inter-cell surrounding interference.

BRIEF DESCRIPTION OF DRAWINGS

FIG. 6 is an RRC connection management method for low energy of a UE according to an embodiment of the present disclosure and is a diagram illustrating a UE modem operation process for each state according to an operation scenario for a multi-RAT (4G, 5G) low energy operation in an LTE-5G Tight Integration operation environment.

FIG. 11 is a diagram illustrating a UE modem operation process for each state according to an operation scenario for a multi-RAT (4G, 5G) low energy operation in an LTE-5G Independent operation environment according to an embodiment of the present disclosure.

MODE FOR THE INVENTION

Figure 1:
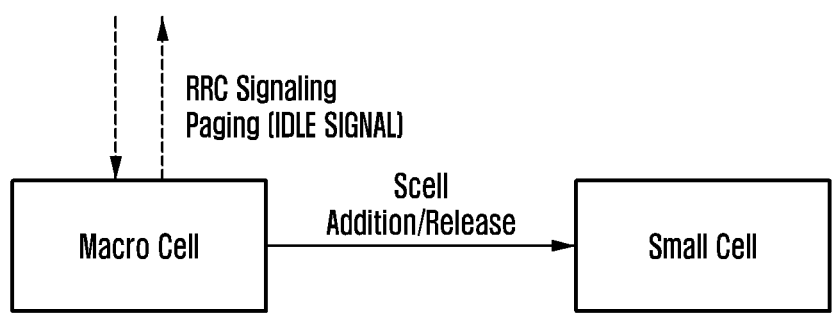
FIG. 1 is a diagram schematically showing an Scell addition/release operation method according to the dual connectivity of a communication system.

Hereinafter, various embodiments of the present disclosure are described in detail with reference to the accompanying drawings. It is to be noted that the same reference numerals are used throughout the drawings to refer to the same elements. Furthermore, a detailed description of the known functions or elements that may make the gist of the present disclosure vague is omitted.

In this specification, in describing the embodiments, a description of contents that are well known in the art to which the present disclosure pertains and not directly related to the present disclosure is omitted in order to make the gist of the present disclosure clearer.

For the same reason, in the accompanying drawings, some elements are enlarged, omitted, or depicted schematically. Furthermore, the size of each element does not accurately reflect its real size. In the drawings, the same or similar elements are assigned the same reference numerals.

The merits and characteristics of the present disclosure and a method for achieving the merits and characteristics will become more apparent from the embodiments described in detail in conjunction with the accompanying drawings.

However, the present disclosure is not limited to the disclosed embodiments, but may be implemented in various different ways. The embodiments are provided to only complete the disclosure of the present disclosure and to allow those skilled in the art to understand the category of the present disclosure. The present disclosure is defined by the category of the claims. The same reference numerals will be used to refer to the same or similar elements throughout the drawings.

In the present disclosure, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing apparatus, so that the instructions executed by the processor of the computer or other programmable data processing apparatus create means for executing the functions specified in the flowchart block(s). These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block(s). The computer program instructions may also be loaded into a computer or other programmable data processing apparatus to cause a series of operational steps to be performed on the computer or other programmable apparatus to produce a computer-executed process, so that the instructions performing the computer or other programmable apparatus provide steps for executing the functions described in the flowchart block(s).

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

The term "unit", as used in the present embodiment means software or a hardware component, such as a field programmable gate array (FPGA) or an application-specific integrated circuit (ASIC), and the "unit" performs specific tasks. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operation on one or more CPUs within a device or a security multimedia card.

The present disclosure proposes an operation of a base station (BS) and user equipment (UE) and an apparatus therefor, for achieving energy efficiency KPI being discussed in a $3^{rd}$ generation partnership project (3GPP) radio access network (RAN) 5 generation (5G) communication system standardization process. In the corresponding standard, an energy efficient operation is defined by aiming at a main target of improving power efficiency [bit/J] of a UE and BS network 1000 times or more within 10 years. To this end, in an mmWave operation of a high frequency band, a control method of reducing the active operation time of a UE is being discussed in order to solve an additional power consumption possibility according to an essential beamforming transmission method.

The present disclosure proposes contents regarding a method of controlling and maintaining an RRC connection in an LTE-5G Tight Integration environment (non-stand alone environment (NSA)) and an LTE-5G Independent environment (stand alone environment (SA)) based on multi-link (ML), that is, 5G network architecture candidates. In particular, there is proposed a control process of minimizing a CP tail (radio tail or user inactivity timer), that is, the remaining maintenance time of the RRC connected state of a BS, if beamforming transmission in an mmWave band, that is, a high frequency band, is performed. Accordingly, there is proposed a method of supporting the function of maintaining a 5G cell RRC connected state to a minimum in order to minimize battery power consumption of a network and UEs operating through a multi-RAT modem (LTE and 5G).

In a wireless communication UE, the RRC state for transmitting and receiving data has been conservatively designed based on the design of a previous generation based on a voice call. For example, a UE has severe power consumption because it maintains a standby time (e.g., Connected DRX) in the RRC connected state although there is no traffic arrival for a given time after traffic reception. Furthermore, in the case of a smartphone user, data, such as a keep alive message not related to user quality of service (QoS), frequently occurs. If an RRC connection therefor is maintained as at the present, user equipment power consumption may become further deteriorated.

Through the present disclosure, a power consumption reduction effect of a UE is expected because the 5G cell RRC connected state of 5G multi-RAT UEs is maintained to a minimum through CP tail minimization control of a BE. Furthermore, there is proposed a method of improving cost efficiency through a reduction in the power consumption of a 5G BS (RU/TRxP) and radio resource use efficiency through a reduction in 5G inter-cell surrounding interference because a 5G cell measurement operation of a UE is limitedly performed.

In the following description of description of the present disclosure, a radio access technology (RAT) named 5G is a new RAT for supporting high capacity traffic, and refers to an RAT that belongs to RATs supported by a multi-RAT capable UE and that is capable of higher QoS support, such as a high link capacity or shorter latency. In contrast, a legacy RAT refers to an RAT that belongs to RATs supported by a multi-RAT capable UE and that is capable of relatively low QoS support, but is advantageous in the energy efficiency aspect because power consumption is small.

Furthermore, the 5G RAT may be understood as a high frequency BS due to the nature of an occupied frequency band. In this case, 4G LTE, that is, the legacy RAT, may be understood as a low frequency BS because it occupies a relatively low frequency band. Meanwhile, a sub-6 GHz band and an above-6 GHz band are functionally separated within a communication system according to the 5G RAT, and may be responsible for the roles of the aforementioned low frequency BS and high frequency BS.

In accordance with another embodiment, the following contents of the invention may also be applied to a communication system in which a 4G cell operates as a master node (MN) and an NR mmWave cell operates as a secondary node (SN) and may also be applied to a communication system in which a sub-6 GHz (low frequency (LF)) BS operates as a master node (MN) and an above-6 GHz (high frequency (HF)) BS operates as a secondary node (SN).

First, FIG. 1 is a diagram schematically showing an Scell addition/release operation method according to the dual connectivity of a communication system. In accordance with a dual connectivity (e.g., described in 3GPP Release 12 small cell enhancement) operation, a macrocell BS controls the RRC connection of a small cell through an RRC message and adds/releases the connection with the small cell. The Scell link connection of a UE is controlled based on such control. A paging operation providing notification of whether data has been reached in the RRC idle state of a UE also operates through a macrocell link.

Figure 2:
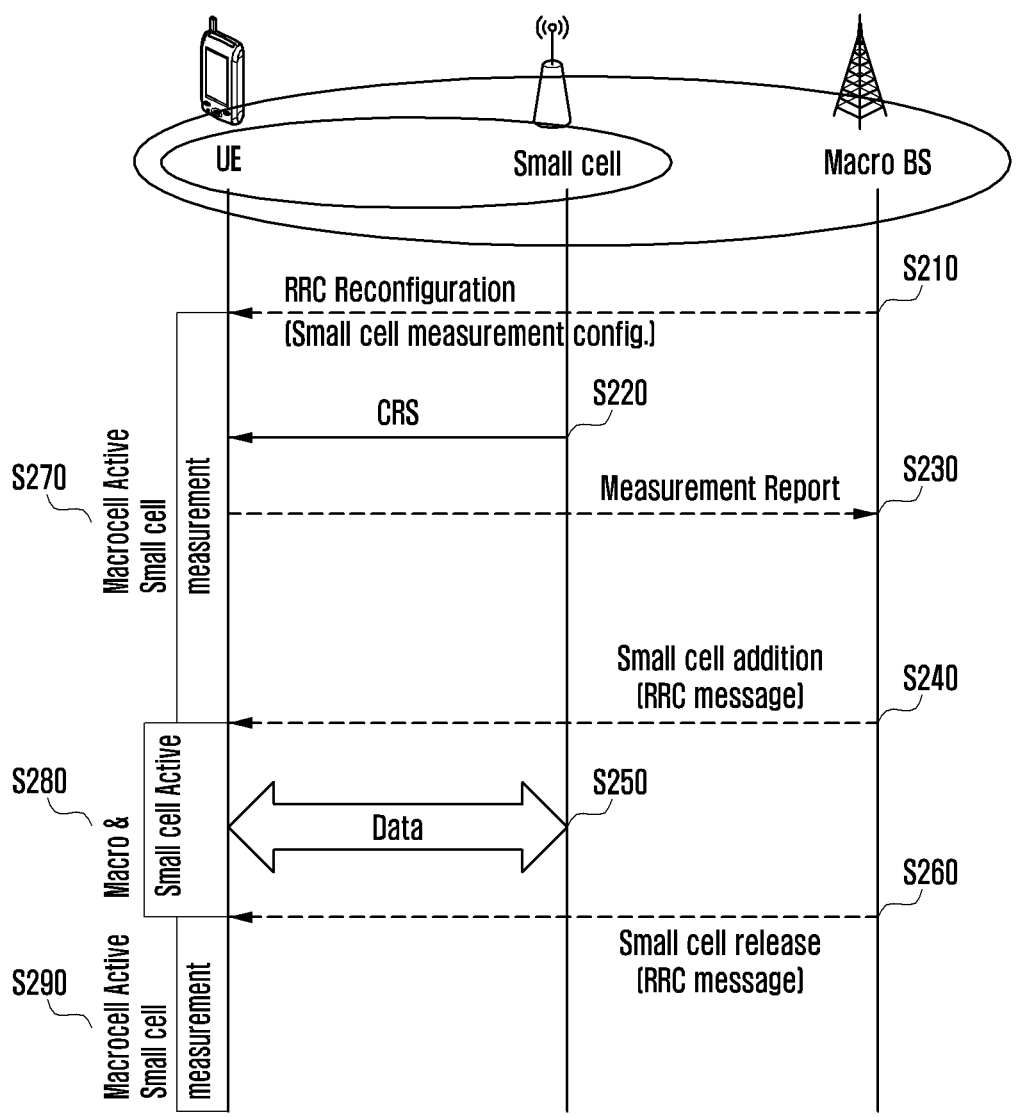
FIG. 2 is a diagram showing an example of a small cell measurement configuration and UE/BS operation according to the dual connectivity of a communication system (e.g., 3GPP Release 12), and is a diagram showing an operation for a UE to continuously perform macrocell and small cell measurement and an operating process of a UE and macrocell and small cell BSs in the RRC connected state.

FIG. 2 is a diagram showing an example of a small cell measurement configuration and UE/BS operation according to the dual connectivity of a communication system (e.g., 3GPP Release 12). In FIG. 2, the UE continuously performs measurement on a macrocell and a small cell and operates along with macrocell and small cell BSs in the RRC connected state.

When a small cell measurement configuration for dual connectivity (e.g., described in 3GPP Release 12) is completed through an RRC reconfiguration message (S210), the UE/BS perform (S270) measurement on the small cell and a measurement report (MR) process (S220, S230). Next, the UE operates (in RRC_Connected) (S280) by turning on an Scell modem based on an addition message (RRC Message, S240) for the small cell from the macrocell BS. In particular, the UE continues to perform measurement on the Scell even prior to the Scell addition. The UE turns off the Scell modem based on a release message (RRC message, S260) for the small cell from the macrocell BS. Such a dual connectivity technology has a problem in that power consumption of a UE is deteriorated because the UE must continuously perform measurement on a macrocell and a small cell and the UE turns on a plurality of modems (performs macrocell and small cell operations) in the RRC connected state.

When power consumption in an mmWave beamforming environment of a high frequency band is taken into consideration, an inefficiency problem in the power consumption aspect becomes further great if the same/similar frequency band environment in the aforementioned dual connectivity operation (a macrocell and small cell link operation in the sub 6 GHz band) is applied to 5G without any change.

Accordingly, the present disclosure solves the above problem and also needs to satisfy the following contents. First, in the present disclosure, an Idle interval needs to be expanded and UE power efficiency needs to be improved by minimizing a 5G cell RRC connected state through CP tail minimization control of a BS. Furthermore, a 5G cell link activation state (RRC connected state and a measurement operation) of a UE is minimized and user QoS also needs to be satisfied (latency criterion is satisfied). Furthermore, network (N/W) signaling overhead and power consumption of a UE, occurring due to frequent transition from the Idle state to the connected state although a UE enters an early Idle state due to a CP tail reduction, need to be minimized.

Figure 3:
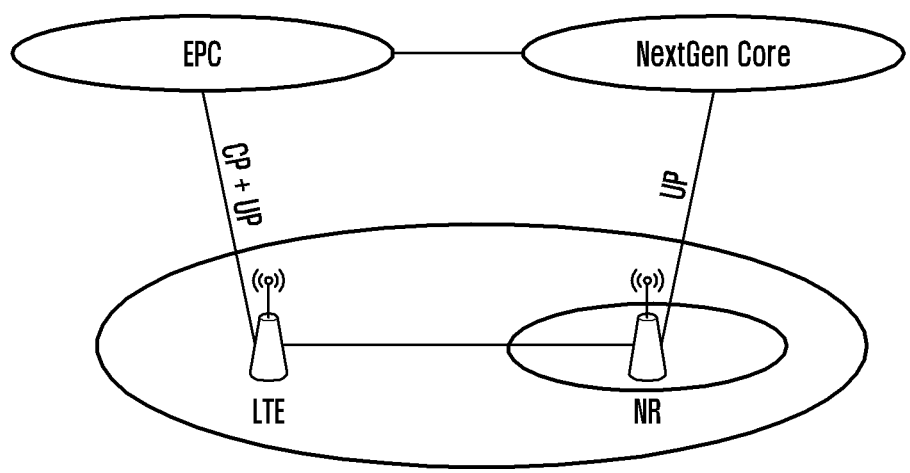
FIG. 3 is a diagram showing an example of a core network architecture and the connection state of a control plane (CP) and user plane (UP) between a UE and a BS in an LTE-5G Tight Integration (non-standalone (NSA)) operation environment according to an embodiment of the present disclosure.

FIG. 3 is a diagram showing an example of a core network architecture and the connection state of a control plane (CP) and user plane (UP) between a UE and a BS in an LTE-5G Tight Integration (non-standalone (NSA)) operation environment according to an embodiment of the present disclosure. In one embodiment, a process of selectively operating a measurement operation for a 5G cell of a UE is described as a first operation method for minimizing the 5G link activation state of a UE.

When the 5G cell modem of a UE operates in a high frequency band, power consumption is caused in a process of transmitting and receiving common control signals (e.g., synchronization, system information, and a reference signal) through beamforming transmission. In contrast, a multi-RAT capable UE may transmit and receive traffic of a low data rate through a legacy RAT (4G/3G/2G, etc.) prior to 5G, and is thus advantageous from the viewpoint of power consumption in minimizing the activation state of a 5G cell link within the UE for the traffic transmission of a higher data rate. A UE chiefly operates in the standby time not having transmission rather than a transmission progress time for a 5G cell link. Accordingly, such an improved measurement operation is very important for the power efficiency improvement of a UE.

An RRC state operation between the LTE and 5G connections of a multi-RAT capable UE may chiefly operate according to the following two methods. The first is an LTE-5G interworking operation shown in FIGS. 3 to 7, and is a BS and UE operation in a 5G non-standalone (NSA) environment. The second is an LTE-5G independent operation shown in FIGS. 8 to 12 and is a BS and UE operation in a 5G standalone (SA) environment.

FIG. 3 is a diagram showing an example of a core network architecture and a control plane (CP) and user plane (UP) connection state between a UE and a BS in an LTE-5G Tight Integration (NSA) operation environment, that is, one of 5G network architecture candidates, in a communication system according to an embodiment of the present disclosure. In the NSA environment shown in FIG. 3, an LTE BS can operate as a macrocell and provide wider coverage because it uses a frequency band of 6 GHz or less. A 5G BS can operate as a small cell because it uses frequency bands of 28 GHz and 6 GHz or more including an mmWave band. In this case, the 4G and 5G core networks are separately present, but there is an interface connecting them. A 4G (LTE) link can connect both a control plane (CP) and user plane (UP) between a UE and a BS. In contrast, 5G (new radio (NR)) can connect both a control plane (CP) and user plane (UP) between a UE and a BS or may assume an operation in which a control plane (CP) between a UE and a BS fully depend on an LTE BS or only a user plane (UP) is performed based on a 5G connection. As another operation example, an operation of implementing some control functions of a control plane (CP) between a UE and a BS in an LTE BS, implementing the remaining control functions through a 5G link, and transmitting and receiving a user plane (UP) through a 5G connection may be considered.

Figure 4:
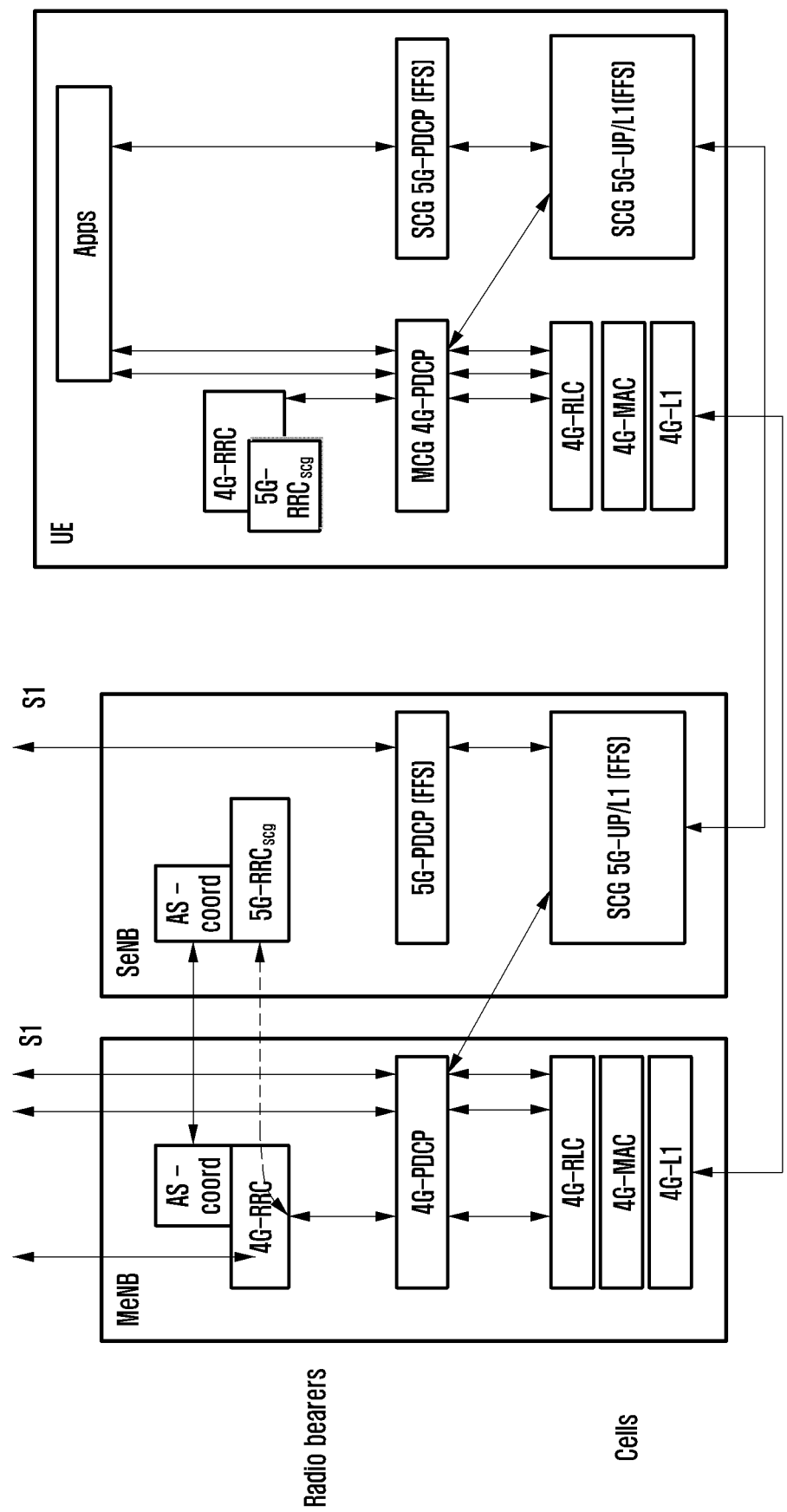
FIG. 4 is a diagram showing an example of a connection state between BSs and signaling between protocol layers in an LTE-5G Tight Integration (NSA) operation environment according to an embodiment of the present disclosure.

FIG. 4 is a diagram showing an example of a connection state between BSs and signaling between protocol layers in an LTE-5G Tight Integration (NSA) operation environment, that is, one of 5G network configuration candidates according to an embodiment of the present disclosure. FIG. 4 divides and shows whether 4G and 5G protocol layers will operate a radio resource control (RRC) layer, a packet data convergence protocol (PDCP) layer, a radio link control (RLC) layer, a medium access control (MAC) layer and a physical (PHY) layer as independent protocol layers or a merged protocol layer. In 5G, a so-called "option 2" structure in which the PDCP layer and the RLC layer are basically separated and implemented is discussed. For example, there is a method for the 4G and 5G protocol layers to operate the RLC, MAC and PHY layers as independent protocol layers and to merge and operate the RRC layer and the PDCP layer.

Figure 5:
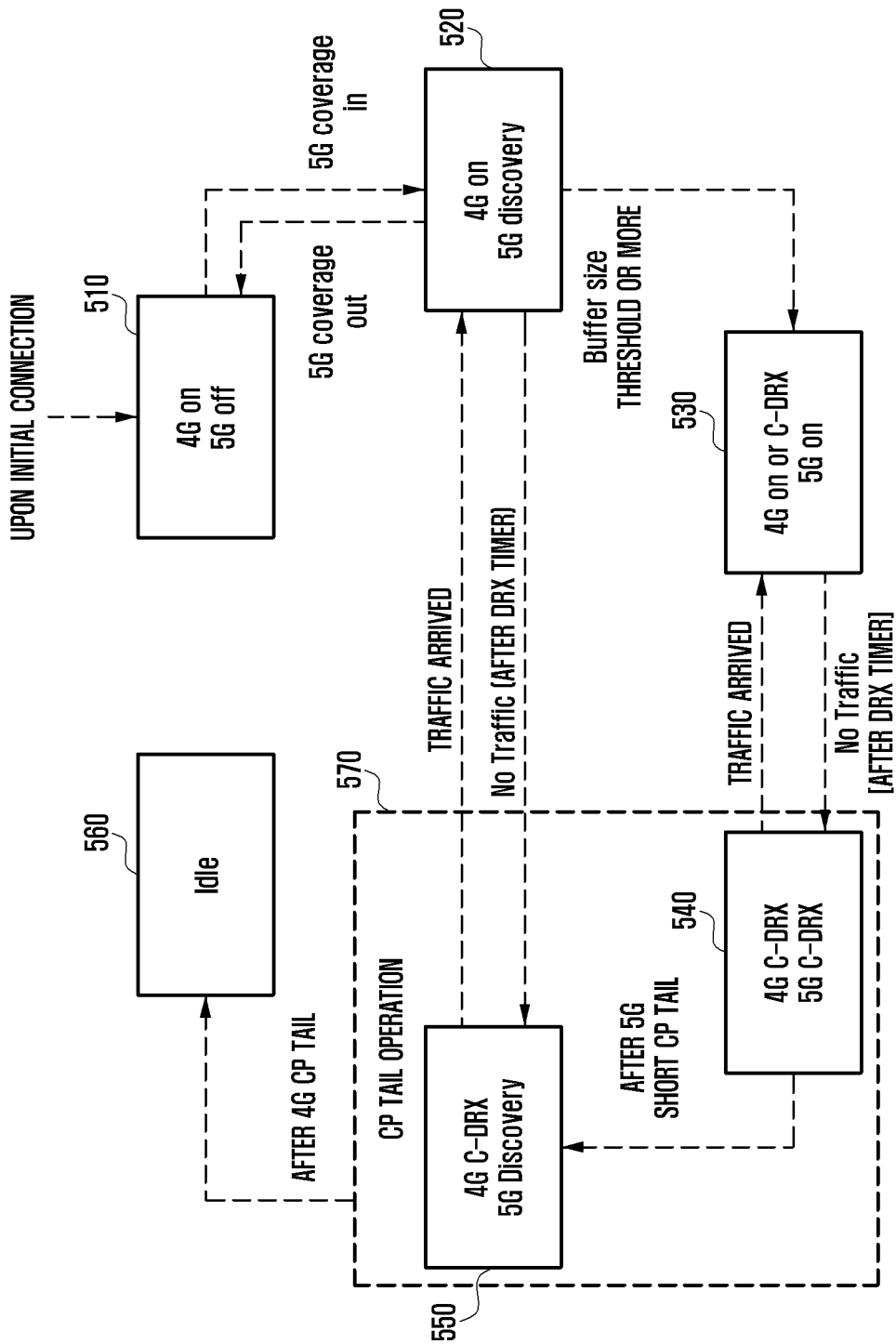
FIG. 5 is an RRC connection management method for low energy of a UE according to an embodiment of the present disclosure and is a diagram illustrating a state diagram for a multi-RAT (4G, 5G) low energy operation in an LTE-5G Tight Integration(NSA) operation environment.

FIG. 5 is an RRC connection management method for low energy of a UE and is a diagram illustrating a state diagram for a multi-RAT (4G, 5G) low energy operation in the LTE-5G Tight Integration(NSA) operation environment.

In the embodiment shown in FIG. 5, detailed operation scenarios of a UE include 1) a 5G link activation necessity and availability sensing operation, 2) a 5G modem turn-on time determination operation, and 3) a different configurations and application operations of C-DRX standby intervals of 4G and 5G in the RRC connected state.

First, 1) a UE needs to perform a preliminary operation (e.g., beam scanning or measurement) before it turns on a high frequency band modem receiver of 5G (NW). In accordance with one embodiment, at least one of a) whether a UE is in coverage of a NR BS, b) QoS necessary for service information (e.g., service type) and service of traffic that needs to be transmitted, and c) the amount of data for traffic that requires transmission support and the state of a buffer accumulated in a UE/BS (i.e., the amount of data accumulated in a buffer) may be selected as a criterion for detecting that such a preliminary operation needs to be started.

In the above embodiment, a process of performing the aforementioned preliminary operation (beam scanning and/or measurement) may be configured by a 4G BS not a 5G BS, and may be performed by a UE. More specifically, a 4G BS may configure a condition for triggering an event for a preliminary operation performed by a UE. The UE performs the preliminary operation (beam scanning and/or measurement) on a 5G BS in response to the event configured by the 4G BS.

In the LTE-5G Tight Integration (NSA) environment, a 5G RAT connection may be supported through a 4G RAT connection between a UE and an LTE BS. When a UE is first connected to a network, a 4G modem is first turned on (510). Next, the UE moves and enters 5G Coverage. When such an operation of the UE is sensed, the UE performs a 5G discovery operation (520). In this case, a process of sensing the entry into 5G coverage includes a determination operation based on indication provided by a BS (network). For example, a 5G indicator of 1 bit may be newly added on system information broadcasted by a 4G BS. Accordingly, the UE that has received a 5G indicator from a 4G BS may be aware that a 5G BS is present within coverage of the corresponding 4G BS. The UE starts scanning in a 5G (NR)-related frequency band. At this time, 5G coverage-related indication provided by the BS (network) will be transmitted as system information of an LTE BS because the UE has not yet turned on the high frequency band modem receiver of 5G (NW). In this case, the 5G indicator of 1 bit is information for notifying the UE that a 5G small cell is present within a macrocell of the corresponding LTE BS.

Next, a service type of uplink or downlink traffic (e.g., when a high-capacity data service of an enhanced mobile broadband (eMBB) starts, when a ultra-reliable low latency communication (URLLC) service of low latency starts, etc) may become another criterion as the criterion for an operation for a UE to start 5G scanning in addition to the indication provided by a BS (network). When uplink/downlink traffic of the aforementioned given service occurs, a UE may start a preliminary operation (scanning or measurement) for turning on the high frequency band modem receiver of 5G (NW). Furthermore, the UE may start a preliminary operation (scanning or measurement) for turning on the high frequency band modem receiver of 5G (NW) using the amount of uplink or downlink traffic, expected by the UE or the BS, as another criterion.

Unlike in the 5G indicator of 1 bit, if it is determined that a preliminary operation needs to be started based on the service type and amount of downlink traffic, there is a need for indication provided by a BS (network) through which the BS notifies a UE of the service type and amount. In accordance with one embodiment, a BS may transmit an RRC (re)configuration message to a UE using a unicast method. In accordance with another embodiment, a method for a network to instruct a UE to perform the preliminary operation by transmitting on-demand system information is also possible as an operation for a BS to notify the UE that the UE needs to start a preliminary operation (scanning or measurement) for turning on the modem receiver of an NR (5G) frequency band.

Furthermore, if it is determined that a preliminary operation needs to be started based on the service type and amount of uplink traffic, a UE transmits a traffic event report to a BS through a 4G RAT or a low frequency link as UE feedback by notifying the BS of the need of the preliminary operation. In accordance with one embodiment, a BS may transmit an RRC (re)configuration message to a UE using a unicast method based on the traffic event report of the UE. In accordance with another embodiment, a method for a network to instruct a UE to perform a preliminary operation by transmitting system information, common system information (or minimum system information), on-demand system information or other system information is also possible as an operation for a BS to notify a UE that a preliminary operation (e.g., beam scanning and/or measurement) for turning on the modem receiver of an NR (5G) frequency band needs to be started.

When a UE recognizes that it needs to start a preliminary operation (scanning or measurement) for turning on the high frequency band modem receiver of 5G (NW) through an indicator transmitted by a 4G BS according to the aforementioned process or through an RRC (re)configuration or on-demand SI provided by a BS (network), the UE may identify that it will start the preliminary operation for turning on the 5G modem by transmitting a response signal to the BS.

Next, an operation for a UE to determine a 5G modem turn-on time (5G ON time determination) after a 5G discovery process is terminated may operate based on a) a buffer state for each UE of a BS and b) the buffer state of a UE. Various layers, such as i) the PDCP layer, ii) the RLC layer, iii) the MAC layer, and iv) the PHY layer, may correspond to protocol layers, that is, a criterion for the buffer state of a BS and a UE. For example, if the 5G modem turn-on time is determined based on the PDCP buffer, the 5G modem of the UE will be turned on based on the PDCP buffer state of each UE of a BS and/or the PDCP buffer state of a UE (530).

More specifically, when the capacity of a buffer for each UE of a BS or the capacity of the buffer of the UE increases to a threshold TH_1 or more, first, the BS recognizes that it needs to start a preliminary operation (scanning or measurement) for turning on the high frequency band modem receiver of 5G (NW) (520). Thereafter, when the capacity of a buffer for each UE of a BS or the capacity of the buffer of the UE increases to a second threshold TH_2 (TH_1<TH_2) or more, an operation of turning on the 5G (NR) high frequency band modem receiver of the UE is performed (530).

Meanwhile, the aforementioned two operations (preliminary operation and 5G modem turn-on operation prior to 5G modem turn-on) according to the capacity of a buffer may be started based a 5G link activation request signal of a UE or BS, may be performed based on the time when the reception of a response feedback message corresponding to such an activation request signal is completed or may be performed by starting data transmission after a timer (time gap for configuring a transmission and reception (Tx/Rx) beam of a UE and a BS) configured in the aforementioned response feedback message.

In accordance with another embodiment, the operation for the UE to determine the 5G modem turn-on time (5G ON time determination) after the 5G discovery process is terminated may be determined based on c) PDCP duplication activation. More specifically, the operation includes an operation for a master node (4G macrocell, a lower frequency BS) to configure whether to activate PDCP duplication in RRC based on a PDCP duplication operation and to determine the 5G modem turn-on time based on an operation of dynamically controlling whether to activate PDCP duplication through a MAC CE.

Furthermore, the operation for the UE to determine the 5G modem turn-on time (5G ON time determination) after the 5G discovery process is terminated may be determined based on d) mobility support according to UE mobility speed (performance requirements for a handover failure, handover latency and a radio link failure). In accordance with one embodiment, when UE moving speed is high speed and thus a threshold (e.g., 120 km/h) or more and a handover latency requirement is a threshold (e.g., 1 second or 0) or less, the operation is performed using an MN link, and includes an operation of performing data transmission without turning on an SN or using a continuously turned-on SN without turning off the SN. Furthermore, the operation includes an operation of performing mobility support of a UE through a continuously turned-on MN without turning off the MN.

Next, the different configurations and application operations of C-DRX standby intervals of 4G and 5G in the RRC connected state, from among the aforementioned embodiments, is described. An operation for the 4G/5G CP Tail differentiation operations according to one embodiment may include an operation of first changing a 5G Link to a low energy mode (C-DRX or Idle DRX) if there is no transmitted and received traffic. For example, when the user-inactivity timer (i.e., CP tail) of a 5G modem is determined and set to 1 second and the user-inactivity timer of a 4G modem is determined and set to 10 seconds, the 5G modem may be first deactivated after 1 second from the last transmission and reception traffic, and the 4G modem may remain in the C-DRX state and may be deactivated after 10 seconds, so the UE makes transition to the RRC idle state.

Meanwhile, low energy operation-related parameters in the RRC layer-related standard document 3GPP TS 36.331 are described like Table 1 to Table 4.

TABLE 1

| MAC-MainConfig field descriptions |
|---|
| drx-Config |
| Used to configure DRX as specified in TS 36.321 [6]. E-UTRAN configures the values in DRX-Config-v1130 only if the UE indicates support for IDC indication. E-UTRAN configures drx-Config-v1130 only if drx-Config (without suffix) is configured. |
| drx-InactivityTimer |
| Timer for DRX in TS 36.321 [6]. Value in number of PDCCH sub-frames. Value psf1 corresponds to 1 PDCCH sub-frame, psf2 corresponds to 2 PDCCH sub-frames and so on. |
| drx-RetransmissionTimer |
| Timer for DRX in TS 36.321 [6]. Value in number of PDCCH sub-frames. Value psf1 corresponds to 1 PDCCH sub-frame, psf2 corresponds to 2 PDCCH sub-frames and so on. In case drx-RetransmissionTimer-v1130 is signalled, the UE shall ignore drx-RetransmissionTimer (i.e. without suffix). |
| drxShortCycleTimer |
| Timer for DRX in TS 36.321 [6]. Value in multiples of shortDRX-Cycle. A value of 1 corresponds to shortDRX-Cycle, a value of 2 corresponds to 2 * shortDRX-Cycle and so on. |

TABLE 2

| DRX-Config ::= | CHOICE { |
|---|---|
| release | NULL, |
| setup | SEQUENCE { |
| onDurationTimer | ENUMERATED { psf1, psf2, psf3, psf4, psf5, psf6, psf8, psf10, psf20, psf30, psf40, psf50, psf60, psf80, psf100, psf200}, |
| drx-InactivityTimer | ENUMERATED { psf1, psf2, psf3, psf4, psf5, psf6, psf8, psf10, psf20, psf30, psf40, psf50, psf60, psf80, psf100, psf200, psf300, psf500, psf750, psf1280, psf1920, psf2560, psf0-v1020, spare9, spare8, spare7, spare6, spare5, spare4, spare3, spare2, spare1}, |
| drx-RetransmissionTimer | ENUMERATED { psf1, psf2, psf4, psf6, psf8, psf16, psf24, psf33}, |
| longDRX-CycleStartOffset | CHOICE { |
| sf10 | INTEGER(0..9), |
| sf20 | INTEGER(0..19), |
| sf32 | INTEGER(0..31), |
| sf40 | INTEGER(0..39), |
| sf64 | INTEGER(0..63), |
| sf80 | INTEGER(0..79), |
| sf128 | INTEGER(0..127), |

TABLE 2-continued

```
        sf160                   INTEGER(0..159),
        sf256                   INTEGER(0..255),
        sf320                   INTEGER(0..319),
        sf512                   INTEGER(0..511),
        sf640                   INTEGER(0..639),
        sf1024                  INTEGER(0..1023),
        sf1280                  INTEGER(0..1279),
        sf2048                  INTEGER(0..2047),
        sf2560                  INTEGER(0..2559)
    },
    shortDRX                    SEQUENCE {
        shortDRX-Cycle              ENUMERATED {
                                        sf2, sf5, sf8, sf10, sf16, sf20,
                                        sf32, sf40, sf64, sf80, sf128, sf160,
                                        sf256, sf320, sf512, sf640},
        drxShortCycleTimer          INTEGER (1..16)
    }   OPTIONAL                                                -- Need OR
}
}
DRX-Config-v1130 ::=                SEQUENCE {
    drx-RetransmissionTimer-v1130       ENUMERATED {psf0-v1130}      OPTIONAL, --Need OR
    longDRX-CycleStartOffset-v1130      CHOICE {
        sf60-v1130                          INTEGER(0..59),
        sf70-v1130                          INTEGER(0..69)
    }                                                                OPTIONAL, --Need OR,
    shortDRX-Cycle-v1130                ENUMERATED {sf4-v1130} OPTIONAL --Need OR
}
```

TABLE 3

RRM-Config field descriptions ue-InactiveTime
Duration while UE has not received or transmitted any user data. Thus the timer is still running in case e.g., UE measures the neighbour cells for the HO purpose. Value s1 corresponds to 1 second, s2 corresponds to 2 seconds and so on. Value min1 corresponds to 1 minute, value min 1s20 corresponds to 1 minute and 20 seconds, value min1s40 corresponds to 1 minute and 40 seconds and so on. Value hr1 corresponds to 1 hour, hr1min30 corresponds to 1 hour and 30 minutes and so on.

TABLE 4

```
-- ASN1START
RRM-Config ::=              SEQUENCE {
    ue-InactiveTime             ENUMERATED {
                                    s1, s2, s3, s5, s7,
s10, s15, s20,
                                    s25, s30, s40, s50,
min1, min1s20c, min1s40,
                                    min2, min2s20, min3,
min3s30, min4, min5, min6,
                                    min7, min8, min9,
min10, min12, min14, min17, min20,
                                    min24, min28, min33,
min38, min44, min50, hr1,
                                    hr1min30, hr2,
hr2min30, hr3, hr3min30, hr4, hr5, hr6,
                                    hr8, hr10, hr13,
hr16, hr20, day1, day1hr12, day2,
                                    day2hr12, day3, day4,
day5, day7, day10, day14, day19,
```

TABLE 4-continued

```
                                    day24, day30,
                                    dayMoreThan30} OPTIONAL,
....
```

For the different configurations and application operations of C-DRX standby intervals of 4G and 5G, in accordance with one embodiment, drx-Config, drx-InactivityTimer, drx-RetransmissionTimer, and drxShortCycleTimer parameters included in the MAC-MainConfig field configured between a UE and a BS, the ue-InactiveTime parameter of the RRM-Config field, and a setting value corresponding to a sub-parameter, described in Table 1 to Table 4, may be separated, configured and applied as an LTE set (or low/lower frequency or a sub-6 GHz link) and an NR set (or high/higher frequency or an above-6 GHz link) not one set in 5G.

For example, as in Table 5 and Table 6 below, a UE can differentially configure and operate C-DRX standby intervals of 4G and 5G by configuring separate drx sets for 5G in the MAC-MainConfig field and the RRM-Config field. In Table 5 and Table 6, "nr" is added to a parameter configuring a new drx set for 5G and indicated. In this case, the parameters shown in Table 5 and Table 6 are merely simple examples, and other parameters may be additionally configured in order to differently operate C-DRX between 4G and 5G. Conversely, in the described embodiment, parameters may be configured in a form in which some parameters have been omitted. As one method for differently operating C-DRX between 4G and 5G, the parameters to which "nr" has been added for a 5G connection may be configured as a value shorter than or longer than parameters for a 4G connection, and some parameters may be configured as the same value.

TABLE 5

```
DRX-Config ::=              CHOICE {
    release                     NULL,
    setup                       SEQUENCE {
        onDurationTimer             ENUMERATED { },
        drx-InactivityTimer         ENUMERATED { },
```

TABLE 5-continued

```
        drx-RetransmissionTimer           ENUMERATED { },
        longDRX-CycleStartOffset          CHOICE { },
        shortDRX                          SEQUENCE {
            shortDRX-Cycle                    ENUMERATED{ },
            drxShortCycleTimer                INTEGER (1..16)
        } OPTIONAL                                                    -- Need OR
    }
}
DRX-Config-v1130 ::=                      SEQUENCE {
    drx-RetransmissionTimer-v1130             ENUMERATED {psf0-v1130}    OPTIONAL,  --Need OR
    longDRX-CycleStartOffset-v1130            CHOICE {
        sf60-v1130                                INTEGER(0..59),
        sf70-v1130                                INTEGER(0..69)
    }                                                                  OPTIONAL,  --Need OR
    shortDRX-Cycle-v1130                      ENUMERATED {sf4-v1130}  OPTIONAL,  --Need OR
}
DRX-Config-nr ::=                         SEQUENCE {
    onDurationTimer__nr                       ENUMERATED { },
        drx-InactivityTimer__nr                                            ENUMERATED { },
        drx-RetransmissionTimer__nr                                        ENUMERATED { },
        longDRX-CycleStartOffset__nr                                   CHOICE { },
        shortDRX__nr                                                   SEQUENCE {
            shortDRX-Cycle__nr                                             ENUMERATED{ },
            drxShortCycleTimer__nr                                         INTEGER (1..16),
}
```

TABLE 6

```
-- ASN1START
RRM-Config ::=          SEQUENCE {
    uc-InactiveTime         ENUMERATED { }      OPTIONAL,
    ....
RRM-Config__nr ::=      SEQUENCE {
    uc-InactiveTime__nr     ENUMERATED { }      OPTIONAL,
    ....
```

According to the aforementioned embodiment, in a process of dualizing C-DRX parameters for a 4G connection and a 5G connection, several criteria may be applied. First, if the parameters are classified based on a communication generation, they are classified based on a 4G connection and a 5G connection. Second, the parameters may be classified for each frequency band. For example, parameters related to a 6 GHz or less frequency band link and a 6 GHz or more frequency band link may be dualized and configured. Third, a method of dualizing and configuring the parameters depending on beamforming is possible. Fourth, a method of dualizing and configuring the parameters based on a beam number threshold (wide beam and narrow beam) is possible. Finally, a method of dualizing and configuring the parameters based on a modem having high power efficiency and a modem having low power efficiency is possible. In a process of dualizing and configuring the C-DRX-related parameters according to the aforementioned several criteria, an embodiment in which two or more criteria are complexly applied is possible.

The parameters dualized and configured according to the aforementioned embodiment may include the drx-Config, drx-InactivityTimer, drx-RetransmissionTimer, and drxShortCycleTimer parameter corresponding to the MAC-MainConfig field related to the illustrated Connected DRX (C-DRX), and ue-InactiveTime of the RRM-Config field. In addition, the parameters may further include other parameters and some of the parameters may be excluded.

In accordance with the aforementioned embodiment and another embodiment, a user-inactivity timer, that is, a timer for the RRC state transition of a UE, may be differentially configured and operated for each 4G/5G link. The user-inactivity timer is a parameter related to the aforementioned CP tail and radio tail. When the user-inactivity timer expires, a UE releases an RRC connection and operates in the RRC idle state. In this case, for example, if a BS implements and applies User-inactivity timer_1 and User-inactivity timer_2 as separate parameters or configures them in the UE, when a corresponding timer expires, the UE can automatically release an RRC connection and make transition to an idle state or inactive state even without signaling to the BS.

That is, the aforementioned process may be separately applied to a timer, that is, a criterion for switching from the RRC connected state to the idle state, and a timer, that is, a criterion for switching from the RRC connected state to the inactive state. This may mean an operation of changing the RRC state from Connected to the idle or inactive state through RRC signaling (RRC release or RRC inactivation signaling) when a corresponding timer expires.

Meanwhile, in the present embodiment, the user-inactivity timer a) may be dualized and configured with respect to a 4G link and a 5G link, b) may be configured by dualizing related parameters with respect to a 6 GHz or less frequency band link and a 6 GHz or more frequency band link for each frequency band, c) may be configured by dualizing related parameters depending on beamforming, d) may be configured by dualizing related parameters based on a beam number threshold (wide beam and narrow beam), and e) may be configured by dualizing related parameters based on a modem having high power efficiency and a modem having low power efficiency. The parameters may be dualized and configured through a combination of two or more of the aforementioned criteria.

In the aforementioned embodiment, in an embodiment in which DRX and inactivity timer sets of an HF and a LF are differentiated, configured and operated, a method for a BS to set corresponding parameters as fixed values and operating them is possible.

In accordance with another embodiment, parameters related to DRX and an inactivity timer may also be determined and configured based on whether each of requirements for whether coverage of a secondary node (SN) BS is included, service information of traffic and QoS required by a service, the amount of data for traffic, the state (amount) of a buffer accumulated in a UE/BS, whether PDCP duplication is activated, mobility speed of a UE, and mobility support, and a combination of two or more of them. That is, an event trigger, defined based on each of conditions based on the cases where a UE is in coverage of a secondary node (SN) BS, service information of traffic and QoS required by a service are low latency or a high capacity, the amount of data for traffic and a buffer capacity accumulated in a UE/MN or an SN BS is a threshold or more, and a PDCP Duplication operation is activated and thus a PDCP packet is transmitted and received both links of the MN and SN, and in the case of mobility support (handover and radio link failure performance requirements) according to UE mobility speed and defined based on a combination of a plurality of the conditions, may be configured and applied.

Furthermore, an embodiment in which the values of a C-DRX parameter and user inactivity timer for an SN link are conservatively determined and set based on the aforementioned contents may also be taken into consideration. An embodiment in which the values of a C-DRX parameter and user inactivity timer for an MN link are conservatively determined and set may also be taken into consideration. In this case, the meaning that the values are conservatively determined and set may mean a method of setting the user inactivity timer relatively long, a method of setting drx-Config and drx-InactivityTimer, that is, sub-parameters of C-DRX, relatively long, a method of setting drx-RetransmissionTimer relatively long, or a method of setting drxShortCycleTimer relatively long.

In accordance with the aforementioned embodiment, in FIG. 5, when traffic does not occur in the state 530, the UE enters a C-DRX mode based on the 5G C-DRX parameter (540). Next, the UE first enters a 5G discovery state when the CP tail of a relatively shorter configured 5G connection expires based on the dualized and configured user-inactivity timer (550). That is, the CP tail operates relatively shorter with respect to a 5G connection, thereby being capable of reducing power consumption of the UE for the 5G connection. Next, when the user-inactivity timer configured with respect to the 4G connection of the UE expires and the RRC connection is released, the UE operates in the RRC idle state (560). In this case, although a plurality of modems supporting different RATs is driven, the UE has one RRC state at one time. Accordingly, the UE becomes the RRC connection state other than the RRC idle state (560), that is, the state in which all the modems for the 4G connection and the 5G connection have been turned off.

As another embodiment for implementing 1) the 5G link activation necessity and availability sensing operation (510, 520), 2) the 5G modem turn-on time determination operation (520, 530), and 3) the different configurations and application operations of C-DRX standby intervals of 4G and 5G in the RRC connected state (570) using the aforementioned detailed operation scenarios, a method of i) introducing a an extended long-period discovery reference signal (RS) design for a low energy operation of a UE and ii) operating 4G LTE link C-DRX or Idle DRX when a 5G (NR) link is activated is also possible. In this case, in a method of configuring an LTE DRX period depending on moving speed and latency requirements of a UE, a method of operating C-DRX or Idle DRX may also be implemented if the UE is a low-speed moving state and the latency requirement is not low latency and permits some latency.

FIG. 6 is an RRC connection management method for low energy of a UE and is an embodiment of a UE modem operation for each state according to operation scenarios for a multi-RAT (4G, 5G) low energy operation in the LTE-5G Tight Integration operation environment. FIG. 6 shows that operations of the 4G modem and 5G modem of a UE are separated depending on the number of cases and the operation scenarios of the UE according to the cases are matched.

A more detailed operation of the UE is described below. The operation of the UE may be divided into four modes depending on whether a multi-RAT modem (4G, 5G) is activated.

(mode 1) a mode in which the 5G cell modem operation of a UE is turned off, a UE operation mode in which a control signal and data are received through a 4G LTE link;

(mode 2) a UE operation mode in which the 5G cell modem of a UE is partially turned on in an extended long-period (TP1) and whether the UE is in 5G cell coverage is identified (discovery operation) based on whether a 5G cell received signal is a threshold or more;

(mode 3) a mode in which the 5G cell modem of a UE is turned on in a middle period (TP2) and the UE measures average channel quality for each 5G cell (RU/TRP/ID) and transmits feedback for handover and cell selection (mode 4) a UE operation mode in which the 5G cell modem of a UE is turned on in a short period (TP3) and the UE measures 5G cell channel quality and the best beam and feeds them back and feeds information for transmission and reception dedicatedly (RU/TRxP/Cell ID) back.

In this case, the modem operation period of the UE is assumed to be (TP1>TP2>TP3>0).

Separately from the four operation modes of the UE, in the discovery process of the UE, the following operation mode change condition (triggering event) may be configured with respect to measurement operation options.

First, an event according to the relation between the movement of a UE and 5G coverage may be configured. For example, the event according to the relation between the movement of a UE and cell coverage may include (1-1) a triggering event in which the UE moves into 5G coverage, (1-2) a triggering event in which the UE moves out of 5G coverage, and (1-3) a triggering event in which the UE moves to a 5G coverage cell center. In the present embodiment, a determination of whether the UE is in 5G coverage may include i) a determination operation based on network (N/W) information (e.g., ANDSF, MME Pre-configuration information) and a message structure of Pre-configuration information and ii) an operation based on an Indication Message of a Legacy RAT BS a Tight-Interworking or multi-link operation within a multi-RAT UE. For example, this includes the design of a new message structure (new field), such as a 1 bit 5G cell indicator within an RRC connection response message, an operation for a BS to configure the new field, signal it to a UE, and apply it to the UE. Furthermore, a determination of whether the UE is in 5G coverage includes iii) an operation based on a signal received from a legacy RAT BS in a Tight-Interworking or multi-link within a multi-RAT UE. Whether the UE is in 5G coverage may be determined by combining the aforementioned three criteria i), ii) and iii).

Second, an event operation may be configured based on a buffer size within a UE. All of PDCP/RLC/MAC/PHY buffers within a UE may correspond to such a buffer. Furthermore, all of PDCP/RLC/MAC/PHY buffers for each UE, supported by BSs of a legacy RAT and new RAT, may correspond to such a buffer. An event according to the buffer sizes of a UE and a BS is divided into the number of cases and described in detail.

(2-1) Event in which the traffic buffer of a UE is zero

Event in which the traffic buffer of a UE is a threshold TH1_21 or more

Event in which the traffic buffer of a UE is a threshold TH2_21 or more (Full buffer>TH2_21>TH1_21>0)

(2-2) (Legacy RAT) event in which a traffic buffer for each UE of a BS is zero (Legacy RAT) event in which a traffic buffer capacity for each UE of a BS is TH1_22 or more (Legacy RAT) event in which a traffic buffer capacity for each UE of a BS is TH2_22 or more (Full buffer>TH2_22>TH1_22>0)

(2-3) (New RAT) event in which a traffic buffer capacity for each UE of a BS is zero (New RAT) event in which a traffic buffer capacity for each UE of a BS is TH3_23 or more (New RAT) event in which a traffic buffer capacity for each UE of a BS is TH4_23 or more (Full buffer>TH4_23>TH3_23>0)

Third, an event based on required QoS information may be configured. In accordance with the present embodiment, the triggering event based on required QoS information may operate based on QoS requirements of a service generated by a UE or server (BS), and the service may operate based on traffic/Bearer/logical CH/RAN Slice (PHY/MAC Resource/Configuration combination) and a combination of them. The triggering event based on required QoS information is divided and described below.

(3-1) Required QoS is a Link Data rate, and

Event in which a required data rate is a threshold TH1_31 or more

Event in which a required data rate is a threshold TH2_31 or more (TH2_31>TH1_31>0)

(3-2) Required QoS is Latency, and

Event in which required latency is a threshold TH1_32 or less

Event in which required latency is a threshold TH2_32 or less (TH2_32>TH1_32>0)

(3-3) Required QoS is Mobility support, and

Event in which UE mobility speed is a threshold TH1_33 or more

Event in which a required radio link failure (RLF) is a threshold TH2_33 or less Event in which required HO latency is a threshold TH3_33 or less.

Fourth, a triggering event based on a recent traffic transmission and reception time may be configured as the event of each of the subframe time of a physical downlink control channel (PDCCH) recently received by a UE/BS, the time when a UE buffer is zero, and the time when a buffer for each UE of a (Legacy and/or New RAT) BS is zero or a combination of two or more of them. In the present embodiment, the triggering event includes a criterion time and a given time lapse after the criterion time.

(4-1) Event after a lapse of a threshold time or more since the time when a UE buffer is zero Event in which a threshold TH1_41 or more Event in which a threshold TH2_41 or more (TH2_41>TH1_41>0)

(4-2) (Legacy RAT) event after a lapse of a threshold time or more after a traffic buffer for each UE of a BS is zero Event in which a threshold TH1_42 or more Event in which a threshold TH2_42 or more (TH2_42>TH1_42>0)

(4-3) (New RAT) event after a lapse of a threshold time or more after a traffic buffer capacity for each UE of a BS is zero Event in which a threshold TH1_43 or more Event in which a threshold TH2_43 or more (TH2_43>TH1_43>0)

FIG. 6 shows operation mode change triggering events (cell coverage, a buffer state, based on required QoS information and a lapse time from the recent traffic arrival time) of a UE according to the aforementioned several conditions, operations for a 5G cell of a UE according to a combination of them, and operations of the connection state to switch and make transition.

In one embodiment of the operation, as in FIG. 6, the 5G cell modem operation of a UE may include remaining in a 5G cell modem OFF state in the aforementioned mode 1 upon initial access, making transition to a 5G cell discovery state based on a 5G cell coverage event (mode 2), then making transition to a 5G cell measurement mode based on a combination of a buffer size-based event (TH1_2x) or/and a (TR1_3x) required QoS information-based event TH1 (mode 3), and making transition to a 5G cell channel detailed measurement or continuous active mode based on a combination of a buffer size-based event (TH2_2x) and/or a (TR2_3x) required QoS information-based event TH1 (mode 4).

Figure 7:
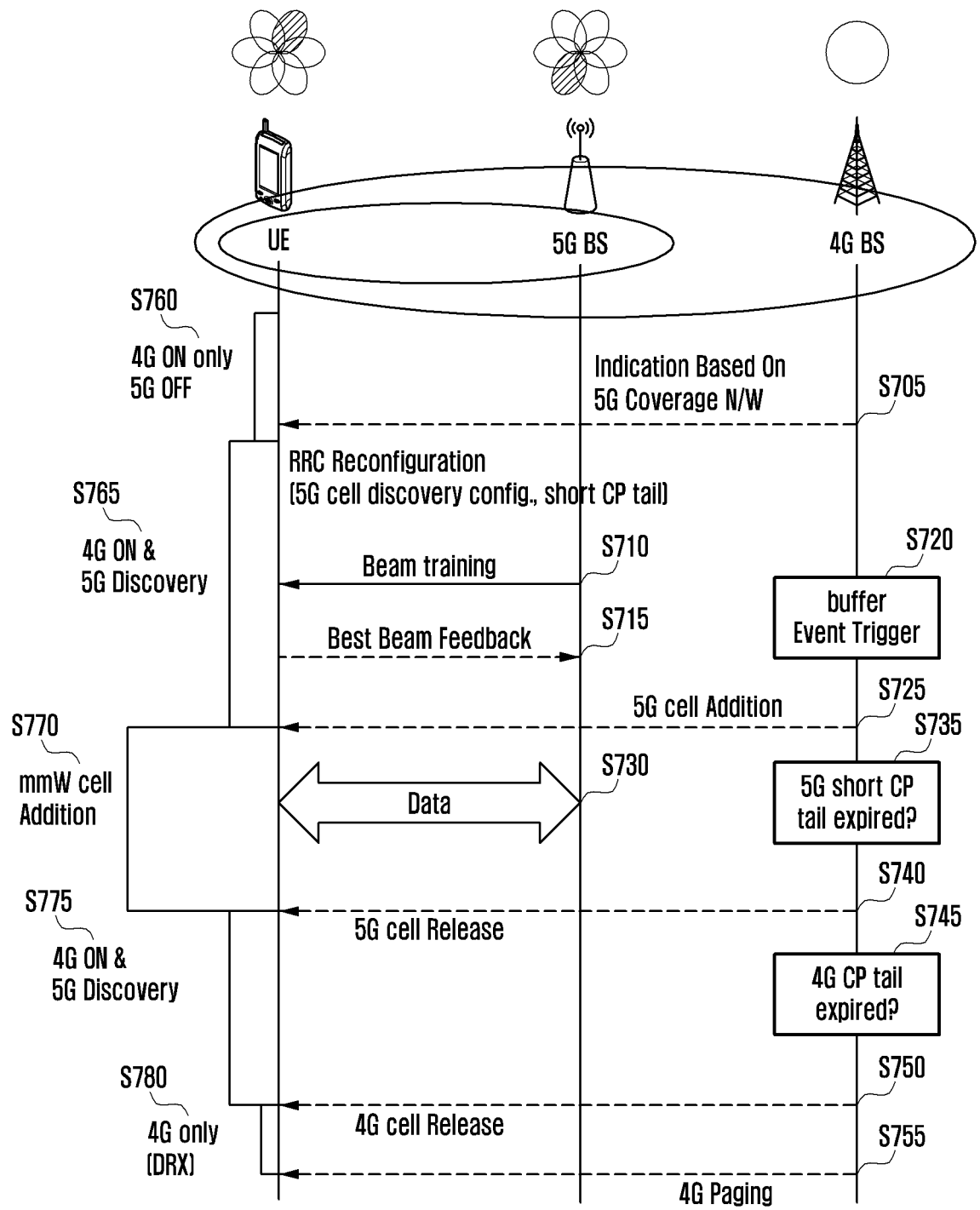
FIG. 7 is an RRC connection management method for low energy of a UE according to an embodiment of the present disclosure and is a diagram illustrating a control signaling flow and a BS/UE modem operation process for a multi-RAT (4G, 5G) low energy operation in an LTE-5G Tight Integration operation environment.

FIG. 7 is an RRC connection management method for low energy of a UE according to an embodiment of the present disclosure and is a diagram illustrating an example of a control signaling flow and a BS/UE modem operation process for a multi-RAT (4G, 5G) low energy operation in an LTE-5G Tight Integration operation environment.

First, in the state in which the 5G modem of a UE has been turned off (S760), an indicator indicative of information about 5G coverage is delivered from a BS supporting the 4G connection of the UE to the UE (S705). The UE receives a parameter for configuring a short CP tail while performing a 5G discovery procedure. Such a parameter related to the CP tail may be a parameter for differentially configuring and operating 4G/5G C-DRX standby intervals as described above.

Next, the UE performs a beam training procedure (S710) through a measurement process for a 5G cell through a 5G discovery procedure (S765), and feeds information about the scanned best beam to the 5G BS (S715). In this case, a triggering event for enabling the UE to initiate the 5G discovery procedure may be generated based on the capacity of the buffer of the BS (S720). When the 5G discovery procedure of the UE is completed, the 4G BS indicates 5G cell addition with respect to the UE (S725). A connection between the 5G BS, that is, a cell of a mmW band, and the UE is established (S770). The UE exchanges data through the connection with the 5G BS (S730). In a C-DRX operation process, when the short CP tail configured with respect to the 5G connection expires (S735), the connection with the 5G cell is released (S740), and the UE operates in the 5G discovery state (S775). Meanwhile, when a CP tail for the 4G connection of the UE also expires (S745), the UE releases the connection with the 4G BS (S750) and operates in the RRC idle mode in which the UE waits for paging from the 4G BS (S755).

In the aforementioned process, the buffer capacity threshold TH1 of the triggering event for enabling the UE to initiate 5G cell measurement and the buffer capacity threshold TH2 of a triggering event for a measurement report (MR) for enabling the UE to report measurement results to the BS may be differently configured. In the situation in which UE UL transmission is necessary, when a UE/BS RLC buffer is the threshold TH2 or more, an operation of transmitting a measurement report (MR) is performed. This is an operation of consuming UE UL transmission power. Since a MeNB, that is, 4G LTE, determines cell addition, a UE performs only an operation of performing measurement and transmitting a measurement report (MR).

An operation in the LTE-5G tight integration environment, that is, in the NSA environment, has been described above. An operation in the LTE-5G independent environment (i.e., SA environment) is described from FIG. 8.

Figure 8:
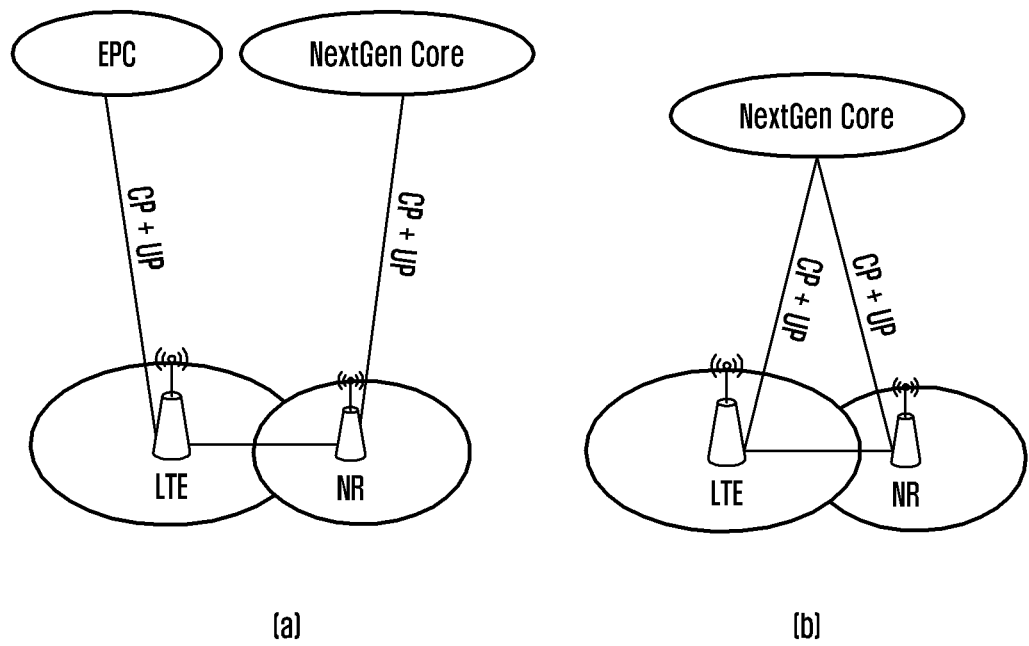
FIG. 8 is a diagram showing an example of the connection state of a control plane (CP) and user plane (UP) between a core network and a BS in an LTE-5G Independent environment (multi-link (ML) or standalone (SA)) according to an embodiment of the present disclosure.

FIG. 8 is a diagram showing an example of the connection state of a control plane (CP) and user plane (UP) between a core network and a BS in an LTE-5G Independent environment based on a multi-link (ML) in a communication system according to an embodiment of the present disclosure. In such an environment, an LTE BS and a 5G (NR) BS independently operate. Such a case may include all of a case where 4G and 5G core networks are separately present, but an interface is present between them, a case where 4G and 5G core networks are separately present, but an interface is not present between them, and a case where a 4G core network evolves and merges with a 5G core network. Since the LTE BS and the 5G (NR) BS independently operate, to connect both a control plane (CP) and user plane (UP) between a UE and a BS in the case of a 4G (LTE) link and to connect both a control plane (CP) and user plane (UP) between a UE and a BS in the case of 5G (NR) may be considered.

Figure 9:
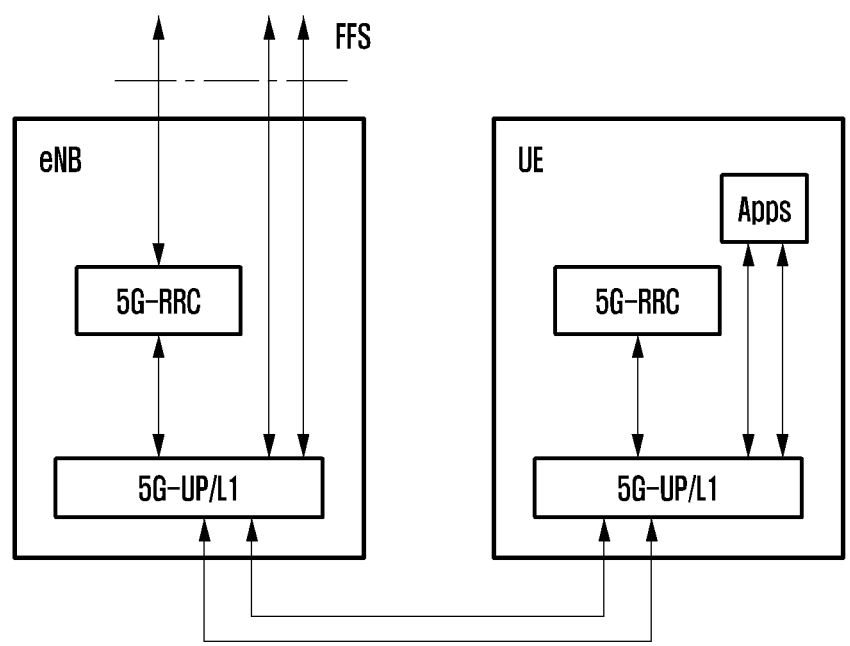
FIG. 9 is a diagram showing an example of a connection state between BSs and signaling between protocol layers in an LTE-5G Independent environment (multi-link (ML)) according to an embodiment of the present disclosure.

FIG. 9 is a diagram showing an example of a connection state between BSs and signaling between protocol layers in an LTE-5G Independent environment (multi-link (ML)) according to an embodiment of the present disclosure. In such an environment, since an LTE BS and a 5G (NR) BS independently operate, 4G and 5G protocol layers may operate as independent protocol layers with respect to the RRC, PDCP, RLC, MAC and PHY layers.

Figure 10:
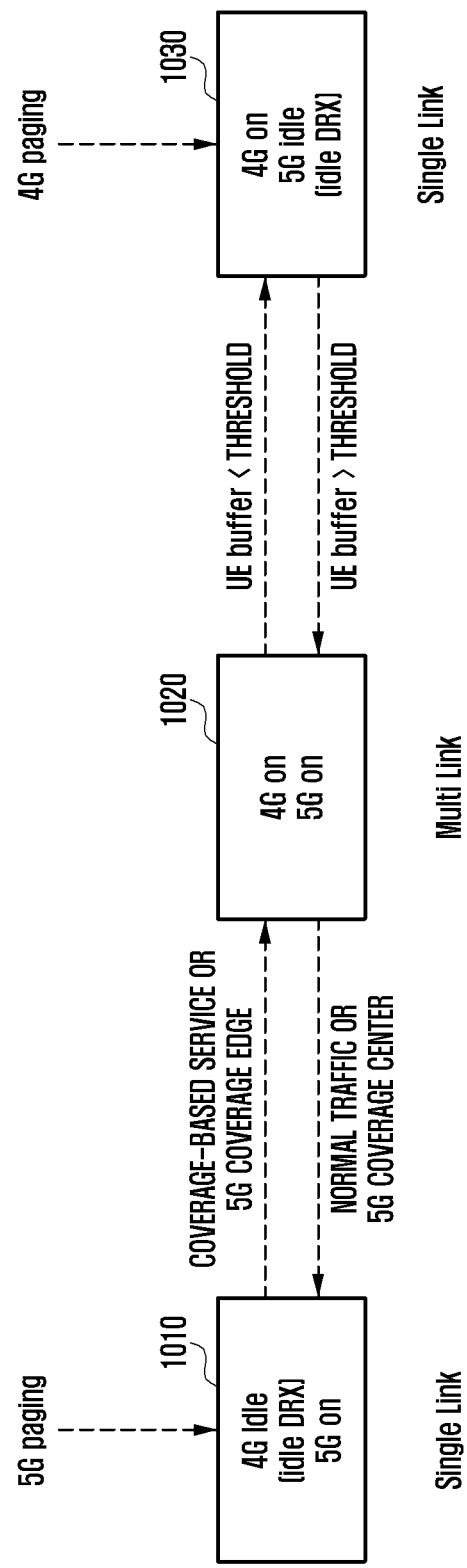
FIG. 10 is a diagram illustrating a state diagram for a multi-RAT (4G, 5G) low energy operation in an LTE-5G Independent operation environment according to an embodiment of the present disclosure.

FIG. 10 is a diagram illustrating a state diagram for a multi-RAT (4G, 5G) low energy operation in an LTE-5G Independent operation environment according to an embodiment of the present disclosure.

In the LTE-5G independent operation environment, 4G and 5G connections are independently controlled (including paging). Such a control operation includes a paging RAT selection process based on cell coverage wherein a UE is placed. Furthermore, in the LTE-5G independent operation environment, a gateway stage may support a flow aggregation. In each of 4G/5G connections, an operation of determining whether traffic/coverage/QoS support for a UE is necessary, determining whether a multi-link will be turned on (1020) or a single link (5G only or 4G only) will be turned on (1010, 1030) based on a result of the determination, and applying a result of the determination may be performed.

Such a process may operate based on coverage of a cell where a UE is placed. Specifically, a determination operation based on each criterion and combination may be performed based on a 4G cell/5G cell received signal level or coverage-related indication from a network. Alternatively, such a process may operate based on the type of high quality traffic (e.g., VoIP or a new URLLC service) that may be supported for a UE or a determination operation based on a buffer state within a BS/UE may be performed based on a QoS condition.

FIG. 11 is a diagram illustrating an example of a UE modem operation for each state according to an operation scenario for a multi-RAT (4G, 5G) low energy operation in an LTE-5G Independent operation environment according to an embodiment of the present disclosure.

An RRC state operation of a multi-RAT capable UE may include the following four states.

(ST1: state 1) Legacy RAT RRC_Connected/New RAT RRC_Idle (ST2) Legacy RAT RRC_Connected/New RAT RRC_Connected (ST3) Legacy RAT RRC_Idle/New RAT RRC_Connected (ST4) Legacy RAT RRC_Idle/New RAT RRC_Idle In this case, the RRC connected state is divided into a continuous reception mode and a C-DRX mode. The RRC_Idle state is subdivided into an Idle DRX (paging) step and an inactive mode in which all of modem circuits are turned off.

A multi-RAT capable UE operating in the four different states may operate based on the condition of each of an event (TRiggering event 1 (TR1): event 1) depending on new RAT (5G) cell coverage, an event (TR2) according to a buffer condition (buffer size), an event (TR3) depending on whether high QoS traffic is present, and an event (TR4) based on required QoS information or a combination of two or more of them. Such a multi-RAT capable UE may operate as follows while changing the aforementioned RRC state in response to the event according to the aforementioned several conditions.

In the LTE-5G (MN-SN) independent, that is, the SA environment, after a 5G discovery process is terminated, an operation for a UE to determine a 5G modem turn-on time (5G ON time determination) includes an operation of determining a 5G modem turn-on time based on mobility support (performance requirements for a handover failure, handover latency and a radio link failure) according to UE mobility speed. In one embodiment, when UE moving speed is high speed and thus a threshold (e.g., 120 km/h) or more and a handover latency requirement is a threshold (e.g., 1 second or 0) or less, the operation is performed using an MN link, and includes an operation of performing data transmission without turning on an SN or using a continuously turned-on SN without turning off the SN. Furthermore, the operation includes an operation of performing mobility support of a UE through a continuously turned-on MN without turning off the MN.

(ST1) Legacy RAT RRC_Connected/New RAT RRC_Idle: when a case where a buffer size is a TR2-based threshold or more or required QoS is a threshold (Data rate, latency requirements) TR3 or more is satisfied, a 5G cell is turned on and operates as an ST2

(ST2) Legacy RAT RRC_Connected/New RAT RRC_Connected: when required QoS is a (mobility requirements, UE mobility speed) threshold or less or satisfies at least one in response to the event depending on 5G coverage (TR1) in a 5G-centered coverage area condition (TR3), a 4G cell is turned on and operates as an ST3

(ST3) Legacy RAT RRC_Idle/New RAT RRC_Idle: if time of a threshold or more elapses in response to the event based on the recent traffic transmission and reception time, a 5G cell and a 4G cell are turned on and operate as an ST4

(ST4) Legacy RAT RRC_Idle/New RAT RRC_Idle: since multi-RAT capable UE paging can support both the two RATs, a multi-RAT UE selectively receives one of the New RAT and the Legacy RAT and operates.

In the LTE-5G interworking, NSA environment, a UE has operated to receive LTE (4G) paging in the RRC idle state. In contrast, in the LTE-5G independent, SA environment, a UE may operate to receive paging based on a recent RAT that has been recently turned on. That is, a multi-RAT capable UE may operate to randomly select one of the two RATs and to receive a paging message and may operate to select an RAT whose connection has been terminated most recently and to receive a paging message.

According to the aforementioned embodiment, an operation of controlling the RRC connected state to a minimum in a 5G cell of a multi-RAT capable UE may also be applied to the SA environment. That is, RRC state connection control of a multi-RAT capable UE may include a process of operating a CP tail for a new RAT (NR) relatively shorter than a CP tail for the legacy RAT. In accordance with one embodiment, RRC state connection control of a multi-RAT capable UE may include an operation of designing the CP tail for the new RAT close to zero (0)+margin (margin <<1) and immediately making transition to the RRC idle state right after NR traffic is transmitted and received.

In this case, regarding whether a paging reception or non-reception idle state for the NR will operate, whether a paging association operation will be performed is determined depending on the LTE-5G interworking environment and the LTE-5G independent environment. Information related to the paging association operation may be delivered to a multi-RAT UE using a method for a core network, such as an ANDSF or MME, to notify the multi-RAT UE of the information through a legacy RAT or new RAT BS when the UE first accesses an N/W.

Criterion conditions for reducing/expanding the RRC state are described below. First, embodiments for reducing an RRC connection are described. In order to stop the RRC connected state of a corresponding 5G cell earlier than an initially configured timer and to change a UE into to an idle mode or a mode in which paging is not received, a 5G BS/UE may perform at least one of:

(ST1) an operation of immediately transmitting the RRC release message of a BS, (ST2) an operation of transmitting a fast dormancy request message of a UE (ST3) an operation of transmitting a power preference indicator (PPI) message of a UE Conversely, embodiments in which an RRC connection is delayed are described. In order to additionally minimize N/W signaling overhead and power consumption of a UE occurring due to frequent transition from the idle state to the connected state although the UE enters an early Idle state attributable to a reduction in the CP tail by expanding the RRC connected state of a corresponding 5G cell greater than an initially configured timer, a 5G BS/UE may perform at least one of:

(SUS1) an operation of delaying the transmission of a BS RRC release message;

(SUS2) an operation of transmitting a UE new RRC Suspend request message; and (SUS3) a timer extension operation through UE dummy data transmission.

The embodiment in which DRX and inactivity timer sets for HF and LF cells in the SA environment, among the aforementioned embodiments, are differentiated, configured and operated may also include a method for a BS to configure a corresponding parameter as a fixed value and operate it.

Another embodiment may also include an operation of determining and configuring parameters related to DRX and an inactivity timer based on each of the requirements for whether coverage of a secondary node (SN) BS is included, service information of traffic and QoS required by a service, the amount of data for traffic, the state (amount) of a buffer accumulated in a UE/BS, mobility speed of a UE, and mobility support, and a combination of two or more of them is also possible. That is, an event trigger, defined based on each of conditions based on the cases where a UE is in coverage of a secondary node (SN) BS, service information of traffic and QoS required by a service are low latency or a high capacity, the amount of data for traffic and a buffer capacity accumulated in a UE/MN or an SN BS is a threshold or more, and in the case of mobility support (handover and radio link failure performance requirements) according to UE mobility speed and defined based on a combination of a plurality of the conditions, may be configured and applied.

Furthermore, an embodiment in which the values of a C-DRX parameter and user inactivity timer for an SN link are conservatively determined and set based on the aforementioned contents may also be taken into consideration. An embodiment in which the values of a C-DRX parameter and user inactivity timer for an MN link are conservatively determined and set may also be taken into consideration. In this case, the meaning that the values are conservatively determined and set may mean a method of setting the user inactivity timer relatively long, a method of setting drx-Config and drx-InactivityTimer, that is, sub-parameters of C-DRX, relatively long, a method of setting drx-RetransmissionTimer relatively long, or a method of setting drxShortCycleTimer relatively long.

Figure 12:
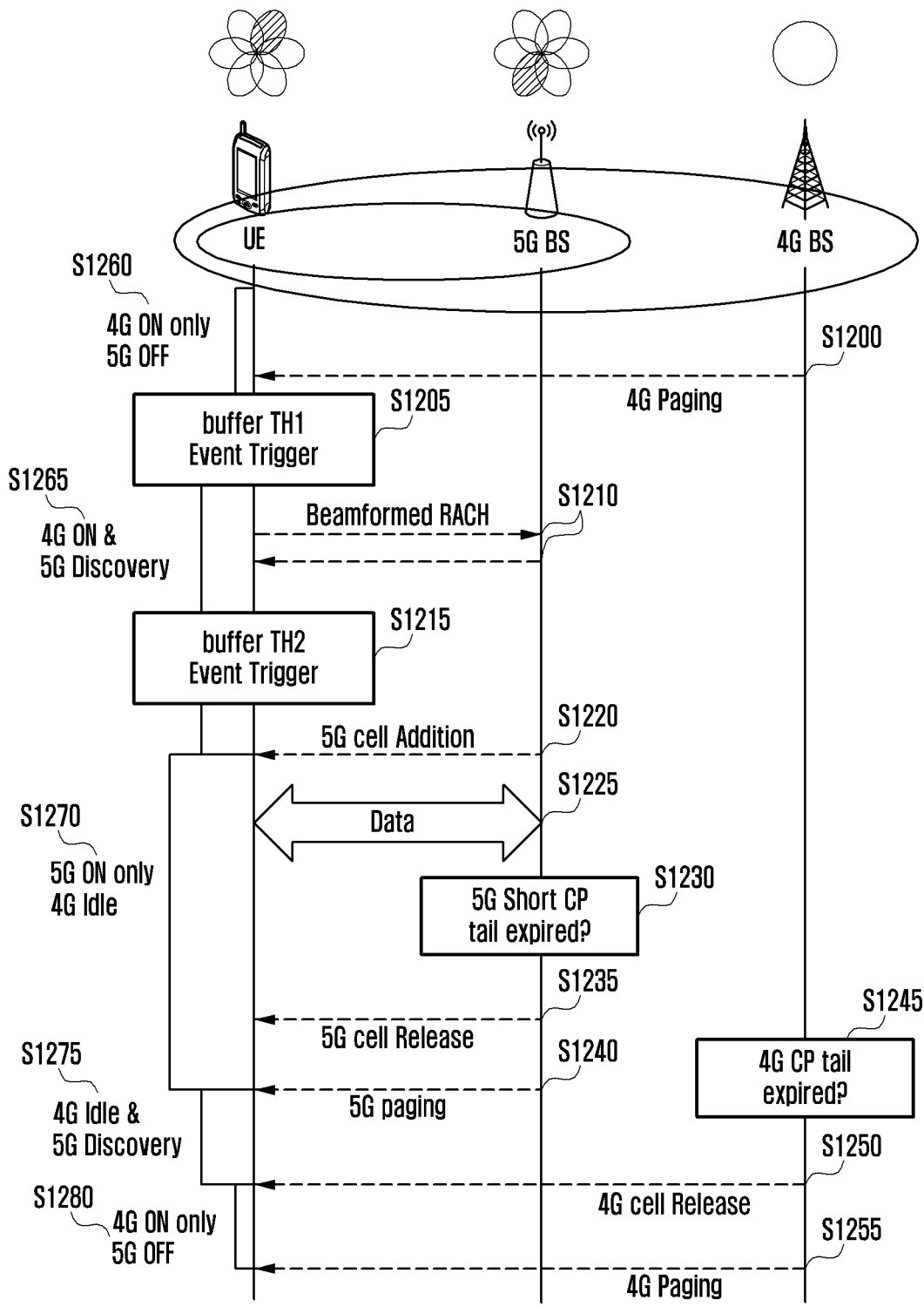
FIG. 12 is a diagram illustrating a control signaling flow and a BS/UE modem operation process for a multi-RAT (4G, 5G) low energy operation in an LTE-5G Independent operation environment according to an embodiment of the present disclosure.

FIG. 12 is a diagram illustrating an example of a control signaling flow and a BS/UE modem operation process for a multi-RAT (4G, 5G) low energy operation in an LTE-5G Independent operation environment according to an embodiment of the present disclosure.

First, in the state in which the 5G modem of the UE has been turned off and only the 4G modem has been turned on (S1260), a paging message is delivered from a BS, supporting the 4G connection of the UE, to the UE (S1200). When the UE recognizes a necessity to turn on a 5G connection in response to a triggering event (S1205) to compare the capacity of a buffer with a given threshold TH1, the UE performs a 5G discovery procedure (S1265) and performs a beamforming random access channel (RACH) procedure on a BS supporting a 5G connection (S1210).

When a connection between the UE and the 5G BS is established and a triggering event (S1215) is satisfied by comparing the capacity of the buffer of the UE with another threshold TH2, the UE adds a 5G cell and exchanges data through the connection with the 5G BS (S1220, S1225). In such a process, only the 5G connection of the UE is activated and the 4G modem may operate in the RRC idle state (S1270). Meanwhile, after data transmission through the 5G connection of the UE is completed, when a given time elapses (S1230), the 5G modem of the UE is turned off through a 5G cell release process of the UE (S1235). Such a time may be a time interval corresponding to the aforementioned short CP tail.

The 4G connection of the UE is the RRC idle state, and the UE receives a 5G paging message (S1240) in the 5G discovery state (S1275). When the time interval for the 4G connection expires (S1245), the connection with the 4G cell of the UE is also released (S1250). The UE operates in the state in which a 4G paging message is received (S1255).

Figure 13:
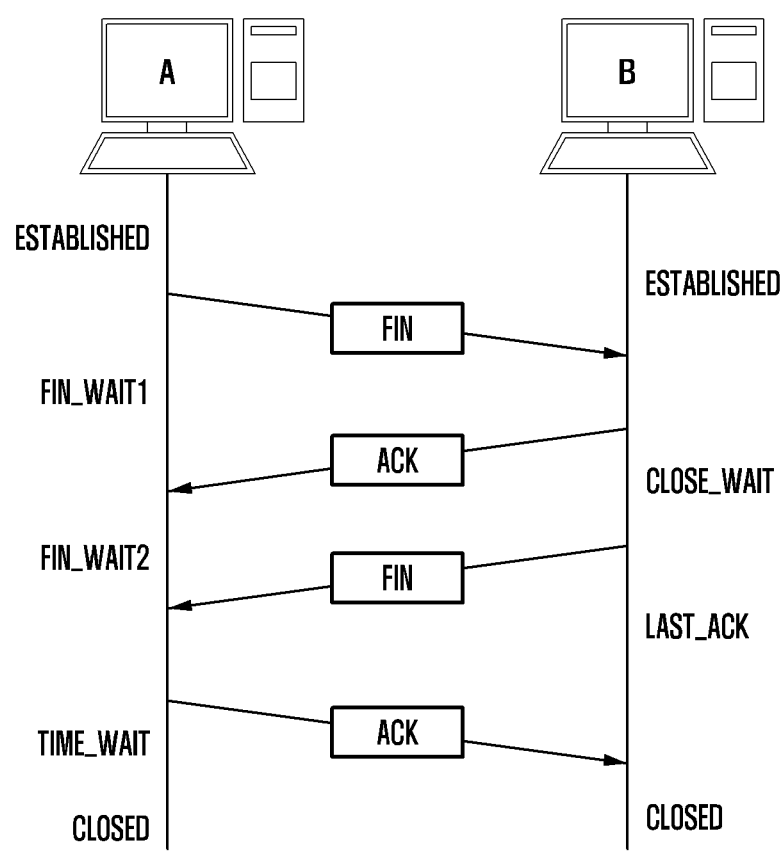
FIG. 13 is a diagram showing an example in which a UE connection standby time reduction operation is implemented based on a traffic end point (TCP flag FIN) for an efficient 5G radio tail (user inactivity timer) interval reduction operation according to an embodiment of the present disclosure, and is a diagram illustrating the final (FIN) indication of a TCP packet from a transmission stage and reception stage and ACK transmission for identifying the final (FIN) indication.

For an efficient 5G radio tail (user inactivity timer) interval reduction operation according to an embodiment of the present disclosure, a UE connection standby time reduction operation based on a traffic end point (TCP flag FIN) is described below. FIG. 13 shows an example of a UE connection standby time reduction operation based on a traffic end point (TCP flag FIN) for an efficient 5G radio tail (user inactivity timer) interval reduction operation according to an embodiment of the present disclosure. This drawing shows the final (FIN) indication of a TCP packet from a transmission stage and a reception stage and ACK transmission for identifying the final indication.

The TCP is a protocol of a transmission layer. The TCP splits data received from a data stream and generates a TCP segment by adding a TCP header. The TCP enables the exchange of data between network nodes to be performed stably without an error. When a transmission node sets the FIN flag of flags 1410, included in a TCP header, to 1 bit and performs transmission, this means that there is no data to be transmitted by the transmission side, that is, the last of transmission. A reception node that has received the FIN flag set to 1 sets an ACK flag to 1 bit and transmits it as a response thereto.

Figure 14:
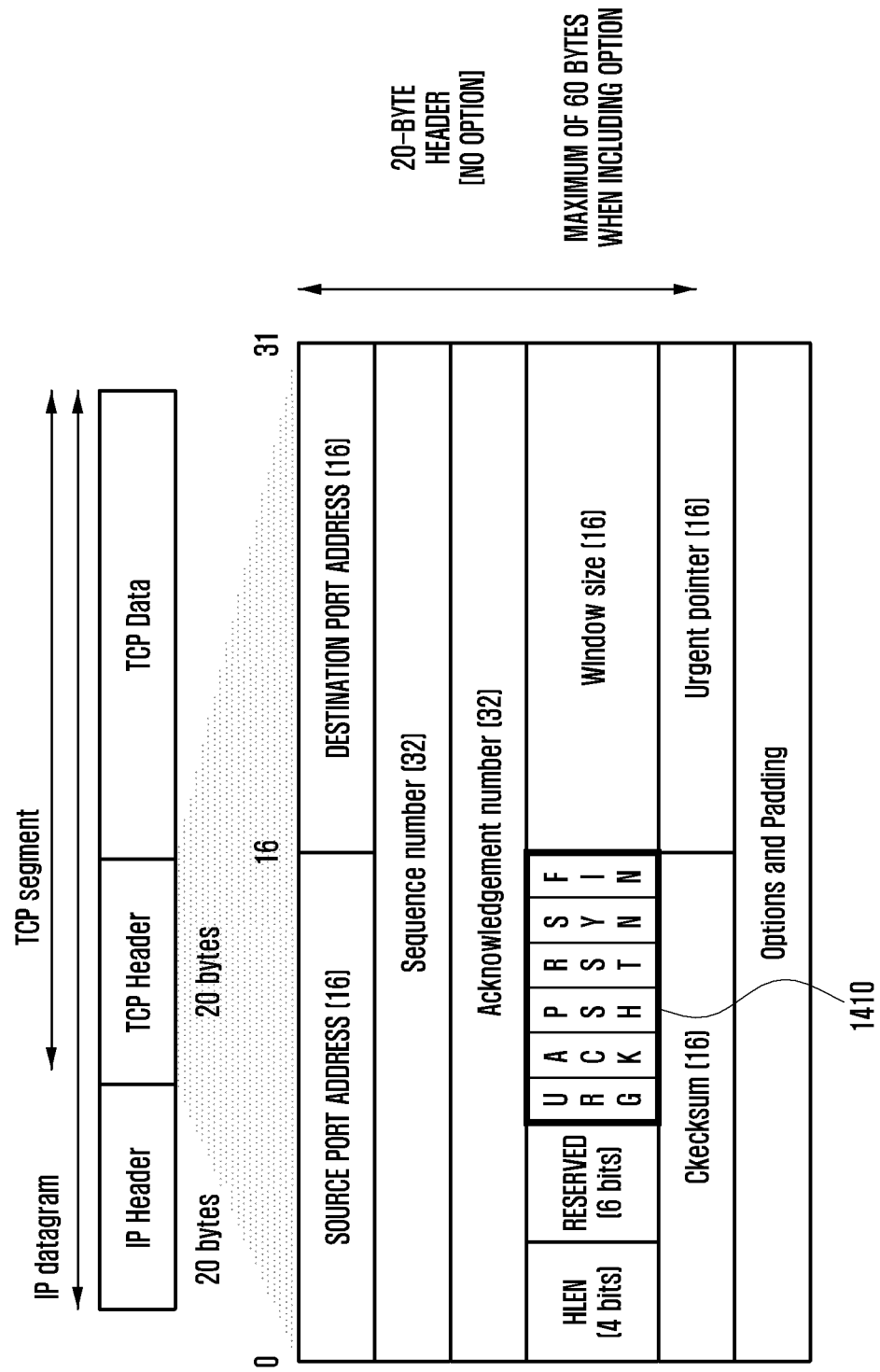
FIG. 14 is a diagram showing another example in which a UE connection standby time reduction operation is implemented based on a traffic end point (TCP flag FIN) for an efficient 5G radio tail (user inactivity timer) interval reduction operation according to an embodiment of the present disclosure, and is a diagram including FIN indicative of the last of transmission as the type of flag marked in a TCP header.

FIG. 14 is a basis technology for showing an example of a UE connection standby time reduction operation based on a traffic end point (TCP flag FIN) for an efficient 5G radio tail (user inactivity timer) interval reduction operation according to an embodiment of the present disclosure, and is a diagram including FIN indicative of the last of transmission as the type of flag marked in a TCP header.

Figure 15:
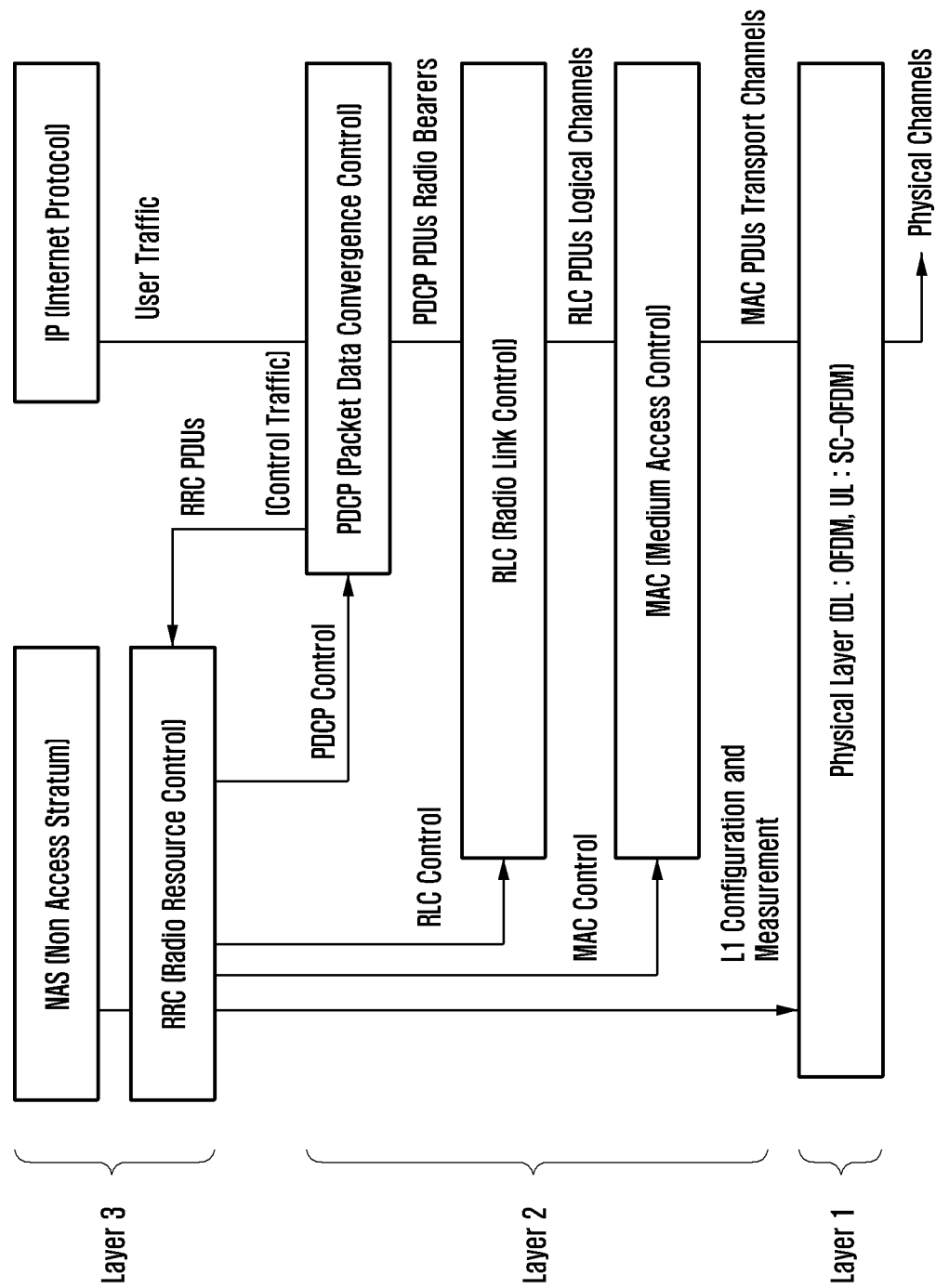
FIG. 15 is a diagram showing yet another example in which a UE connection standby time reduction operation is implemented based on a traffic end point (TCP flag FIN) for an efficient 5G radio tail (user inactivity timer) interval reduction operation according to an embodiment of the present disclosure, and is a diagram in which a hierarchical structure and unit are marked in a wireless communication protocol.

FIG. 15 is a basis technology for showing an example of a UE connection standby time reduction operation based on a traffic end point (TCP flag FIN) for an efficient 5G radio tail (user inactivity timer) interval reduction operation according to an embodiment of the present disclosure, and is a diagram showing a hierarchical structure and unit in a wireless communication protocol.

A TCP-related embodiment is described specifically. A UE inactivity timer (CP tail) for a 5G cell according to the aforementioned embodiment may be configured based on several criteria. For example, in accordance with a first criterion, the UE inactivity timer (CP tail) may be configured based on a traffic end point (TCP flag FIN). When a FIN value, that is, one of the TCP header flags (6 bits), is received, the UE inactivity timer (CP tail) may be configured to early terminate a connection or may be configured to maintain a connection until an ACK flag value is received as a response to the FIN flag. Furthermore, the UE inactivity timer (CP tail) may be configured and operated to extend a connection based on an SYN value, that is, a different flag value of the TCP Header flags (6 bits).

In order to identify such a TCP flag of IP (TCP) traffic, information of the corresponding flag may be identified by performing TCP header parsing on IP (TCP) traffic Header information implemented in the AP of a UE when a PDCP implemented in a UE CP is generated. When a total number of TCP connections of a plurality of TPC connections is 0, the UE operates to transmit UE feedback, for example, a power preference indicator (PPI) so that a BS reduces a radio tail (CP tail) (i.e., perform RRC release).

In this case, the UE and the BS may perform a PPI determination operation based on the number of TPC connections through IP (TCP) flag parsing in order to manage the total number of TCP connections of the plurality of TPC connections. The UE and the BS perform the aforementioned operation for RRC release when the total number of TCP connections is 0 through a number increase (++) operation based on a TCP connection request (SYN) flag and a number reduction (−−) based on a TCP connection termination (FIN) flag.

As another method, a BS may identify information of a corresponding flag by performing TCP header parsing. In this case, a method of performing a radio tail reduction operation by performing the RRC release of the BS without UE feedback transmission is also possible.

An embodiment if a CP tail is reduced and the 5G connection of a UE needs to be extended while minimizing the 5G connection of the UE according to the aforementioned embodiment is described below. In an operation for a UE to feed information regarding whether a data request from a server has been made back to a BS and to use CP tail control, a method of extending a CP tail by notifying the UE that download traffic (e.g., advance and receive Email confirmation and push service) has been scheduled in the server after the UL traffic transmission request is described. For example, i) whether DL data has been transmitted after corresponding UL data, ii) whether ACK/NACK reception is necessary, iii) Keep alive message dedicated, and iv) whether the server has been updated (involving DL transmission) may become conditions for extending the 5G connection of a UE. A combination of two or more of the conditions is also possible. The BS may use information indicative of such criteria by incorporating them in a DRX period and radio tail coordination process.

Conversely, in a method of transmitting whether DL traffic has occurred as a server operation according to a request (UL) from a UE, i) a method of marking in a buffer status report (BSR) new field as a method of marking in a new field of the existing MAC control element or ii) an operation of marking in an UL data MAC header and transmission may be performed based on new/existing control signaling.

Figure 16:
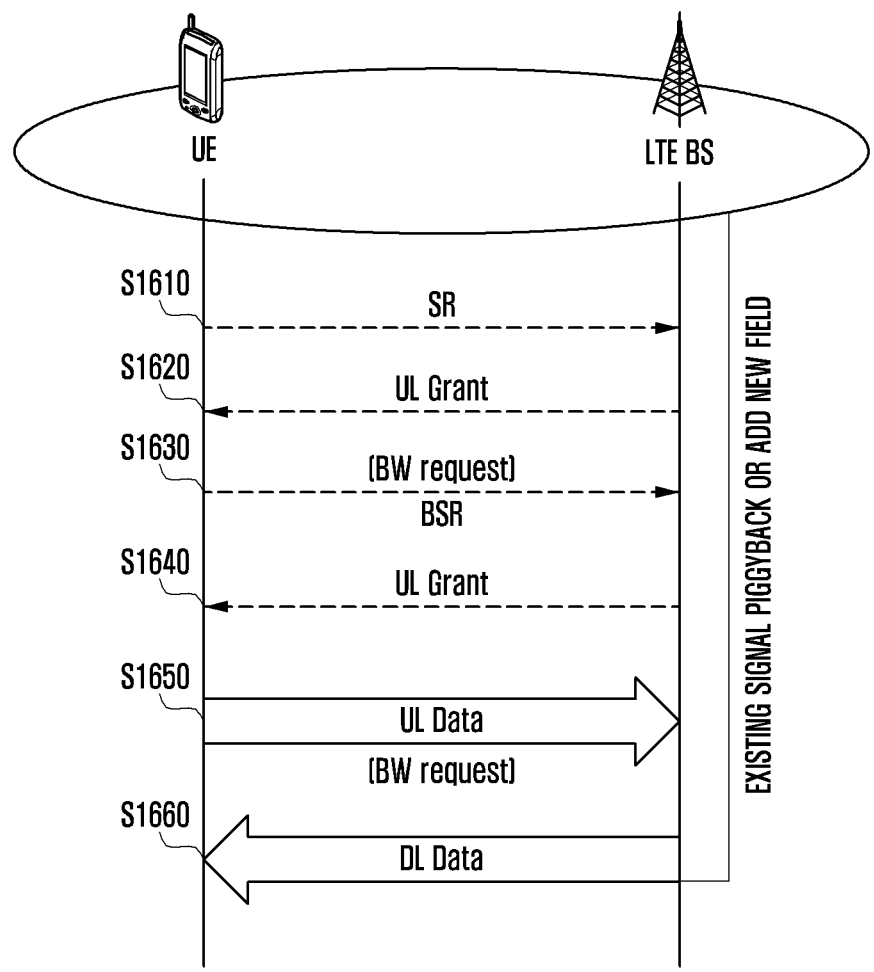
FIG. 16 is a diagram showing an example of an operation based on DL traffic occurrence as a server operation according to a UE request (UL) for a 5G CP Tail interval minimization control operation according to an embodiment of the present disclosure.

FIG. 16 is a diagram showing an example of an operation based on DL traffic occurrence as a server operation according to a UE request (UL) for a 5G CP tail interval minimization control operation according to an embodiment of the present disclosure.

There is a need for a new/existing control signaling design because a data request from a UE needs to be transmitted to a BS through feedback. After the transmission of a scheduling request (SR) and buffer status report (BSR) from a UE, when an uplink grant is received from a BS (S1610, S1620, S1630, S1640), the UE transmits UL data and simultaneously requests DL traffic transmission (S1650). In response thereto, the BS transmits downlink data to the UE (S1660). Such transmission and reception process of the UE and the BS may operate according to i) a method of marking in a new field of the existing MAC control element, for example, a method of marking a data request from the UE in a buffer status report (BSR) new field or ii) a method of marking in an UL data MAC header. As described above, since piggyback on the existing signal is performed or a new field is added, information about each of whether DL data has been transmitted after corresponding UL data of a UE, a criterion regarding whether ACK/NACK reception is necessary, Keep alive message dedicated, and whether a server has been updated (involving DL transmission) and a combination of two or more of them may be transmitted to a BS. Accordingly, the BS may control a C-DRX and idle DRX period for a corresponding link and a standby time (radio tail) from the last transmission and reception traffic based on the received information, may configure the C-DRX and idle DRX period and the standby time (radio tail), and may control the UE by applying them.

Figure 17:
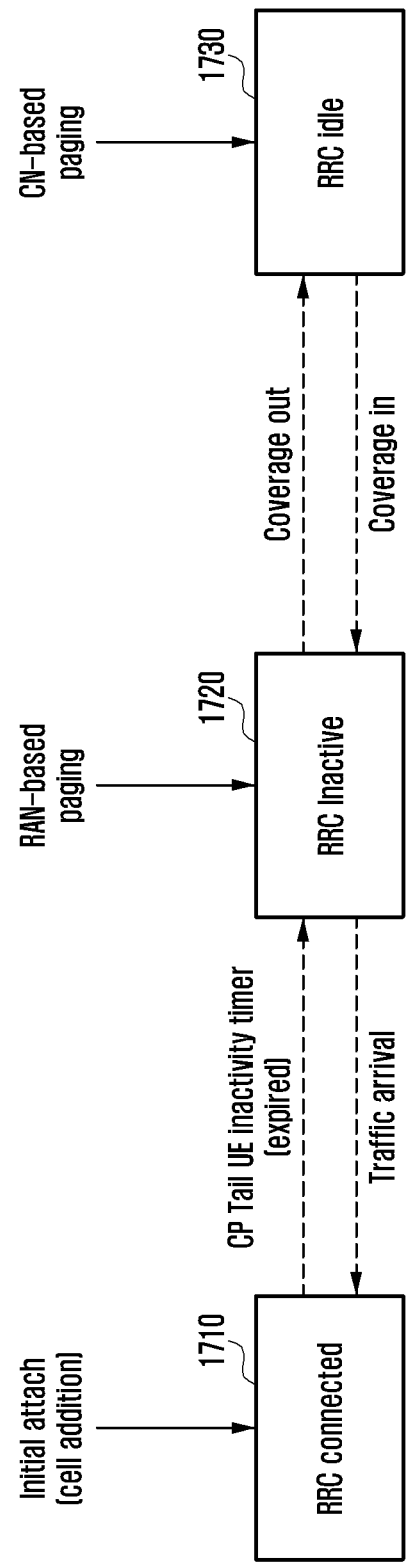
FIG. 17 is a diagram showing an example of an operation based on DL traffic occurrence as a server operation based on the cost of a process for a UE to make transition from the RRC Idle state to the RRC connected state for the purpose of a 5G CP Tail interval minimization control operation according to an embodiment of the present disclosure.

FIG. 17 is a diagram showing an example of an operation based on DL traffic occurrence as a server operation based on the cost of a process for a UE to make transition from the RRC_Idle state to the RRC connected state for the purpose of a 5G CP Tail interval minimization control operation according to an embodiment of the present disclosure.

If a short tail is configured and operated based on an operation based on the cost of an RRC state transition process of a UE, problems of an increase in signaling load when traffic prediction is impossible and QoE deterioration may occur. Such problems may result in, specifically, i) a burden of UE request transmission and BS connection release configuration, ii) power consumption attributable to UE uplink transmission and control resource consumption when multiple UE operations are performed, iii) a burden of a connection reconfiguration after entry into the idle state when the prediction of a traffic pattern is impossible, and iv) LTE UE-based transmission power consumption (523 mW) and latency occurrence (1.4 second: paging latency 1.28 second, and connection reconfiguration 84 ms latency expected).

In order to supplement such problems, an RRC inactive (1720) state (or light connection) in which a procedure consumed when a UE makes transition to the RRC connected state has been minimized may be introduced, instead of immediately entering an RRC idle (1730) state when an RRC connection in an RRC Connected (1710) state is released. Such an RRC inactive state is different in that an RRC connection is not fully released, but is deactivated, unlike the RRC idle state. In this case, a 5G Tail interval minimization operation needs to be designed by taking into consideration a case where the RRC inactive state makes transition to the RRC connected state again. More specifically, the promotion cost (transition to the RRC connected state) of a UE is changed depending on whether a corresponding network operates in legacy idle or in the RRC inactive state after the RRC connected state. A method operating based on i) a latency occurrence time attributable to N/W signaling overhead and ii) BS power consumption of a UE for a corresponding procedure may be implemented as an operation of controlling a CP tail by incorporating such a cost. Meanwhile, instead of introducing the RRC inactive state according to the aforementioned embodiment, an RRC suspend state (ECM Connected state) in which a network, such as a BS, retains context of a UE may be introduced. Transition to the RRC connected state is made through a procedure resumed in the RRC suspend state.

In accordance with one embodiment, in a warming up procedure, that is, an operation necessary prior to wake up (upon on operation) data reception in sleep during a DRX operation, a C-DRX and idle DRX period and a standby time (radio tail) from the last transmission and reception traffic may be controlled by taking into consideration a beamforming synchronization operation, switching on hardware circuit including precise-clock, an RF circuit with massive antennas, and an additional high speed core processor, and they may be signaled.

In accordance with the present embodiment, since a promotion cost varies depending on a UE implementation and network configuration, information related to a promotion time and promotion energy may be added to UE category information, and a network may transmit the UE category information to a BS. The BS may perform RRC release based on the received UE category information.

Furthermore, a minimum idle interval (i.e., the time maintained to a minimum when making transition to RRC Idle) may be determined based on such promotion cost-related information, and transition to the RRC connected state may be delayed. Accordingly, a power reduction effect of a UE when the UE enters the idle mode can be guaranteed because the minimum idle interval maintained to a minimum when the UE makes transition to RRC Idle is applied.

In accordance with another embodiment, as a method of configuring a CP tail based on 5G coverage triggering, if there is no possibility that a UE will be out of 5G coverage or in 5G coverage, an NR CP tail may be set to zero (if there is no possibility that the will be out of 5G coverage) or paging disable (if there is no possibility that the will be in 5G coverage) may operate. In the present embodiment, the method may operate based on Tight-Interworking within a multi-RAT UE or information from a multi-link or legacy RAT BS.

In accordance with another embodiment, in a method of configuring a CP tail based on a UE/BS buffer, as one embodiment of an operation of controlling a radio tail based on a UE/BS buffer, an operation of early executing RRC Release when there is no data in an UL PDCP buffer and when there is no data in a BS DL PDCP buffer is also possible in addition to an operation of delaying PPI transmission when data is present in a UE UL PDCP buffer and an operation of delaying RRC Release when data is present in the BS DL PDCP buffer.

Figure 18:
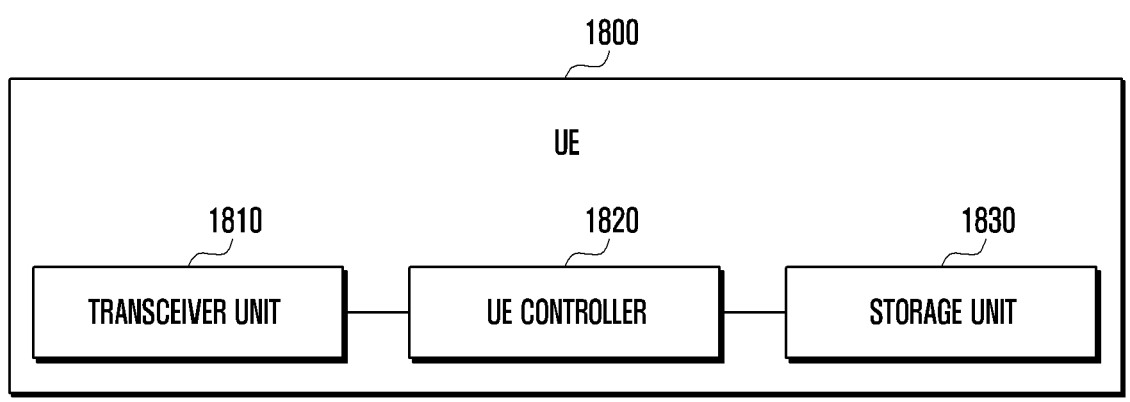
FIG. 18 is a diagram showing the configuration of a UE according to an embodiment of the present disclosure.

FIG. 18 is a diagram showing the configuration of a UE according to an embodiment of the present disclosure. Referring to FIG. 18, the UE may include a transceiver unit 1810, a UE controller 1820, and a storage unit 1830. In the present disclosure, the UE controller 1820 may be defined as a circuit- or application-specific integrated circuit or at least one processor.

The transceiver unit 1810 transmits and receives signals to and from a different network entity. The transceiver unit 1810 may receive system information from a network entity (e.g., a CU, a DU and/or a BS), for example, and may receive a synchronization signal or a reference signal. The transceiver unit 1810 may be implemented in the form of an RF unit including a modem.

The UE controller 1820 may control an overall operation of the UE according to the embodiments proposed in the present disclosure. For example, the UE controller 1820 may control the transceiver unit 1810 and the storage unit 1830 to perform operations according to the embodiments described in the drawings. Specifically, the UE controller 1820 may differently configure the UE inactivity timer for each RAT or may differently turn on/off the modem included in the transceiver unit 1810 for each RAT according to an embodiment of the present disclosure.

The storage unit 1830 may store at least of information transmitted and received through the transceiver unit 1810 and information generated through the UE controller 1820. For example, the storage unit 1830 may store UE inactivity timer-related information received through the transceiver unit 1810.

Figure 19:
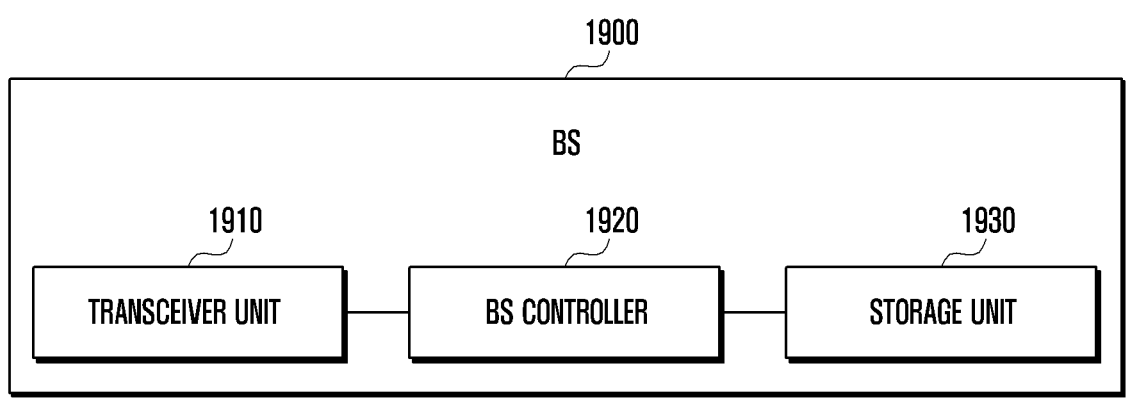
FIG. 19 is a diagram showing the configuration of a BS according to an embodiment of the present disclosure.

FIG. 19 is a diagram showing the configuration of a BS according to an embodiment of the present disclosure. Referring to FIG. 19, the BS may include a transceiver unit 1910, a BS controller 1920, and a storage unit 1930. In the present disclosure, the BS controller 1920 may be defined as a circuit- or application-specific integrated circuit or at least one processor.

The transceiver unit 1910 may transmit and receive signals to and from a different network entity. The transceiver unit 1910 may transmit system information to a UE, for example, and may transmit a synchronization signal or a reference signal. The transceiver unit 1910 may be implemented in the form of an RF unit including a modem.

The BS controller 1920 may control an overall operation of the BS according to the embodiments proposed in the present disclosure. For example, the BS controller 1920 may control the transceiver unit 1910 and the storage unit 1930 to perform operations according to the embodiments described in the drawings. Specifically, the BS controller 1920 may establish or release an RRC connection with a UE according to an embodiment of the present disclosure.

The storage unit 1930 may store at least one of information transmitted and received through the transceiver unit 1910 and information generated through the BS controller 1920. For example, the storage unit 1930 of a CU/DU may store information or a value related to the UE inactivity timer, that is, a standby time in order to release an RRC connection with a UE.

Meanwhile, the preferred embodiments of the present disclosure have been disclosed in this specification and drawings. Although specific terms have been used, they are used in common meanings in order to easily describe the technical contents of the present disclosure and to help understanding of the present disclosure, but are not intended to limit the scope of the present disclosure. It is evident to a person having ordinary skill in the art to which the present disclosure pertains that other modified examples based on the technical spirit of the present disclosure are possible in addition to the disclosed embodiments.

The invention claimed is:

1. A method of transmitting and receiving a signal performed by a terminal in a wireless communication system, the method comprising:
    receiving, from a first base station, system information including an indication used for determining that the terminal entered a coverage area of a second base station, wherein the first base station operates based on a first radio access technology (RAT), and the second base station operates based on a second RAT;
    receiving, from the first base station, a radio resource control (RRC) connection reconfiguration message including measurement configuration information for a cell of the second base station;
    performing a measurement for the cell of the second base station using first information identifying a carrier frequency of the second RAT for the measurement and second information for identifying a threshold of the second RAT, based on the measurement configuration information; and
    transmitting, to the first base station, a result of the measurement for the cell of the second base station.

2. The method of claim 1, further comprising:
    determining that the second base station exists within a coverage of the first base station based on the indication.

3. The method of claim 1, further comprising receiving, from the first base station, a message adding the cell of the second base station as a secondary cell group for the terminal, based on the result of the measurement.

4. The method of claim 3,
    wherein the first RAT is long term evolution (LTE) and the second RAT is new radio (NR), and
    wherein the first base station operates as a master node (MN) for the terminal, and the second base station operates as a secondary node (SN) for the terminal, based on a dual connectivity.

5. A method of transmitting and receiving a signal performed by a first base station in a wireless communication system, the method comprising:
    transmitting, to a terminal, system information including an indication used for determining that the terminal entered a coverage area of a second base station,. wherein the first base station operates based on a first radio access technology (RAT), and the second base station operates based on a second RAT;
    transmitting, to the terminal, a radio resource control (RRC) connection reconfiguration message including measurement configuration information for a cell of the second base station, first information for identifying a carrier frequency of the second RAT for a measurement and second information for identifying a threshold of the second RAT for the measurement being based on the measurement configuration information; and
    receiving, from the terminal, a result of the measurement for the cell of the second base station based on the first information and the second information.

6. The method of claim 5, wherein the terminal determines that the second base station exists within a coverage of the first base station based on the indication.

7. The method of claim 5, further comprising transmitting, to the terminal, a message adding the cell of the second base station as a secondary cell group for the terminal, based on the result of the measurement.

8. The method of claim 7,
    wherein the first RAT is long term evolution (LTE) and the second RAT is new radio (NR), and
    wherein the first base station operates as a master node (MN) for the terminal, and the second base station operates as a secondary node (SN) for the terminal, based on a dual connectivity.

9. A terminal for transmitting and receiving a signal in a wireless communication system, the terminal comprising:
    a transceiver configured to transmit and receive the signal; and
    a controller coupled with the transceiver and configured to:
        receive, from a first base station, system information including an indication used for determining that the terminal entered a coverage area of a second base station, wherein the first base station operates based on a first radio access technology (RAT), and the second base station operates based on a second RAT,
        receive, from the first base station, a radio resource control (RRC) connection reconfiguration message including measurement configuration information for a cell of the second base station,
        perform a measurement for the cell of the second base station using first information identifying a carrier frequency of the second RAT for the measurement and second information for identifying a threshold of the second RAT, based on the measurement configuration information, and
        transmit, to the first base station, a result of the measurement for the cell of the second base station.

10. The terminal of claim 9, wherein the controller is further configured to determine that the second base station exists within a coverage of the first base station based on the indication.

11. The terminal of claim 9, wherein the controller is further configured to receive, from the first base station, a message adding the cell of the second base station as a secondary cell group for the terminal, based on the result of the measurement.

12. The terminal of claim 11,
wherein the first RAT is long term evolution (LTE) and the second RAT is new radio (NR), and
wherein the first base station operates as a master node (MN) for the terminal, and the second base station operates as a secondary node (SN) for the terminal, based on a dual connectivity.

13. A first base station for transmitting and receiving a signal in a wireless communication system, the first base station comprising:
a transceiver configured to transmit and receive the signal; and
a controller coupled with the transceiver and configured to:
transmit, to a terminal, system information including an indication used for determining that the terminal entered a coverage area of a second base station, wherein the first base station operates based on a first radio access technology (RAT), and the second base station operates based on a second RAT,
transmit, to the terminal, a radio resource control (RRC) connection reconfiguration message including measurement configuration information for a cell of the second base station, first information for identifying a carrier frequency of the second RAT for a measurement and second information for identifying a threshold of the second RAT for the measurement being based on the measurement configuration information, and
receive, from the terminal, a result of the measurement for the cell of the second base station based on the first information and the second information.

14. The first base station of claim 13,
wherein the terminal determines that the second base station exists within a coverage of the first base station based on the indication.

15. The first base station of claim 13, wherein the controller is further configured to transmit, to the terminal, a message adding the cell of the second base station as a secondary cell group for the terminal, based on the result of the measurement.

16. The first base station of claim 15,
wherein the first RAT is long term evolution (LTE) and the second RAT is new radio (NR), and
wherein the first base station operates as a master node (MN) for the terminal, and the second base station operates as a secondary node (SN) for the terminal, based on a dual connectivity.

* * * * *